(12) United States Patent
Landers et al.

(10) Patent No.: US 6,413,766 B2
(45) Date of Patent: Jul. 2, 2002

(54) RAPID THERMOCYCLING FOR SAMPLE ANALYSIS

(75) Inventors: James P Landers, Upper Saint Clair; Andreas Hühmer, Pittsburgh, both of PA (US); Robert P. Oda; James R. Craighead, both of Stewartville, MN (US)

(73) Assignee: University of Pittsburgh of the Commonwealth System, Pittsburgh, PA (US)

(*) Notice: Subject to any disclaimer, the term of this patent is extended or adjusted under 35 U.S.C. 154(b) by 0 days.

(21) Appl. No.: 09/759,892

(22) Filed: Jan. 12, 2001

Related U.S. Application Data

(62) Division of application No. 09/015,278, filed on Jan. 29, 1998, now Pat. No. 6,210,882.

(51) Int. Cl.[7] .................................................. C12M 1/36
(52) U.S. Cl. ............................... 435/286.1; 435/287.2; 935/87; 935/88
(58) Field of Search .......................... 435/287.2, 286.1; 935/87, 88

(56) References Cited

U.S. PATENT DOCUMENTS

| | | |
|---|---|---|
| 4,676,274 A | 6/1987 | Brown |
| 4,798,704 A | 1/1989 | Saito et al. |
| 5,187,084 A | 2/1993 | Hallsby |
| 5,304,487 A | 4/1994 | Wilding et al. |
| 5,455,175 A | 10/1995 | Wittwer et al. |
| 5,460,780 A | 10/1995 | Devaney, Jr. et al. |
| 5,486,335 A | 1/1996 | Wilding et al. |
| 5,498,392 A | 3/1996 | Wilding et al. |
| 5,504,007 A | 4/1996 | Haynes |
| 5,508,197 A | 4/1996 | Hansen et al. |
| 5,525,300 A | 6/1996 | Danssaert et al. |
| 5,576,218 A | 11/1996 | Zurek et al. |
| 5,587,128 A | 12/1996 | Wilding et al. |

(List continued on next page.)

FOREIGN PATENT DOCUMENTS

| | | |
|---|---|---|
| EP | 0 568 024 A2 | 11/1993 |
| EP | 0 568 024 A3 | 11/1993 |
| EP | 0 616 218 A1 | 9/1994 |
| WO | WO 89/09437 | 10/1989 |
| WO | WO 95/21382 | 8/1995 |
| WO | WO 96/41864 | 12/1996 |
| WO | WO 97/02357 | 1/1997 |
| WO | WO 98/09728 | 3/1998 |

OTHER PUBLICATIONS

Wooley et al., "Functional Integration of PCR Amplification and Capillary Electrophoresis in a Microfabricated DNA Analysis Device", 1996, Anal. Chem. vol. 68, pp. 4081–4086, USA.

Cheng et al., "Chip PCR.II. Investigation of different PCR Amplification systems in microfabricated silicon–glass chips," 1996, Nucleic Acids Research, vol. 24, No. 2, pp. 380–385, USA.

(List continued on next page.)

Primary Examiner—David A. Redding
(74) Attorney, Agent, or Firm—Thorp Reed & Armstrong, LLP

(57) ABSTRACT

Methods for performing rapid and accurate thermocycling on a sample are disclosed. Use of non-contact heating and cooling sources allows precise temperature control with sharp transitions from one temperature to another to be achieved. A wide range of temperatures can be accomplished according to these methods. In addition, thermocycling can be performed without substantial temperature gradients occurring in the sample. Apparatus for achieving these methods are also disclosed. A method for pumping a sample through microchannels on a microchip using a non-contact heat source is also disclosed.

26 Claims, 16 Drawing Sheets

U.S. PATENT DOCUMENTS

| | | |
|---|---|---|
| 5,589,136 A | 12/1996 | Northrup et al. |
| 5,635,358 A | 6/1997 | Wilding et al. |
| 5,637,469 A | 6/1997 | Wilding et al. |
| 5,639,423 A | 6/1997 | Northrup et al. |
| 5,700,695 A | 12/1997 | Yassinzadeh et al. |

OTHER PUBLICATIONS

Johnston, S.L., et al., "A Novel Method for Sequencing Members of Multi-gene Families, Nucleic Acids Research," vol. 23 (No. 15), pp. 3074–3075, Jul. 6, 1995.

Piatak, Jr., et al., "High Levels of HIV-1 in Plasma During All Stages of Infection Determined by Competitive PCR," Science, vol. 259, pp. 1749–1754, Mar. 19, 1993.

Chang, H-T, et al., "Self-Regulating Dynamic Control of Electroosmotic Flow in Capillary Electrophoresis," Analytical Chemistry, American Chemical Society, vol. 65, pp. 650–652, Jul. 6, 1993.

Burns, M.A. et al., "Microfabricated structures for integrated DNA analysis," Proc. Natl. Acad. Sci., vol. 93, pp. 5556–5561, May 6, 1996.

Fluri, K. et al., "Integrated Capillary Electrophoresis Devices with an Efficient Postcolumn Reactor in Planar Quartz and Glass Chips," Anal. Chem. vol. 68, pp. 4285–4290, Dec. 1, 1996.

Oda, R.P. et al., "Infrared-Mediated Thermocycling for Ultrafast Polymerase Chain Reaction Amplification of DNA," Analytical Chemistry, vol. 70, No. 20, pp. 4361–4368, Oct. 15, 1998.

Seiler, K. et al., "Electroosmotic Pumping and Valveless Control of Fluid Flow within a Manifold of Capillaries on a Glass Chip," Anal. Chem., vol. 66, pp. 3485–3491, Oct. 15, 1994.

McCormick, R.M. et al., "Microchannel Electrophoretic Separations of DNA in INjection-Molded Plastic Substrates," Anal. Chem. vol. 69, No. 14, pp. 2626–2630, Jul. 15, 1997.

Shoffner, M.A. et al., "Chip PCR.I. Surface passivation of microfabricated silicon-glass chips for PCR, Nucleic Acids Research," vol. 24, No. 2, pp. 375–379, Jan. 15, 1996.

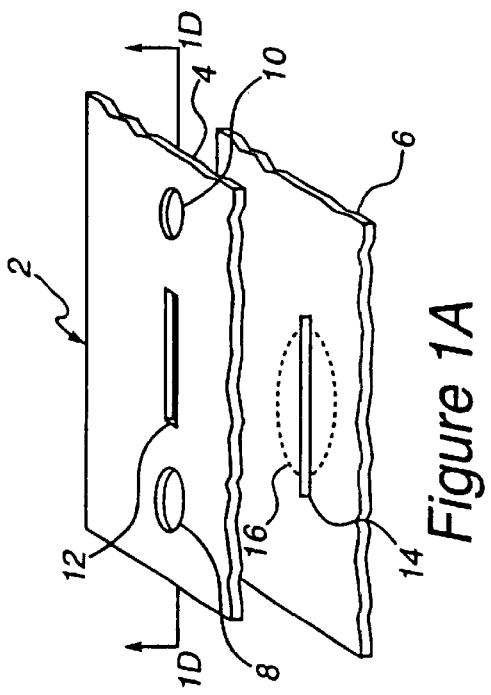
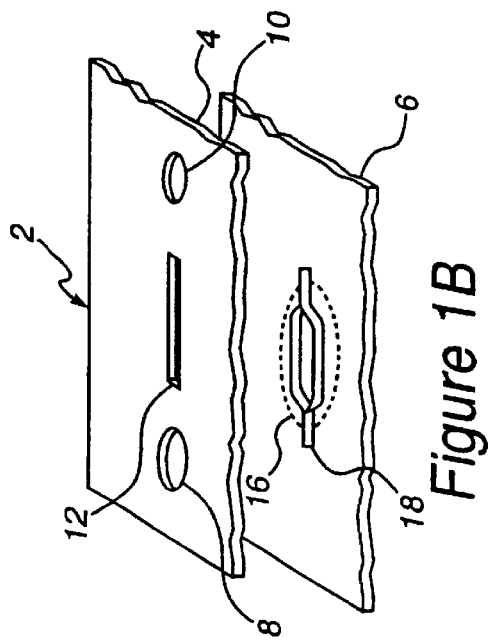
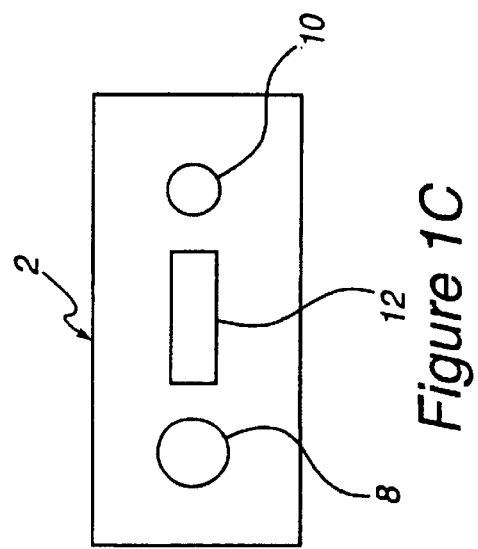
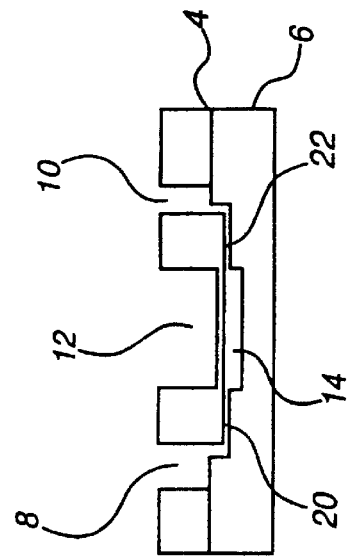

RAPID THERMOCYCLING FOR SAMPLE ANALYSIS

This application is a divisional of prior U.S. application Ser. No. 09/015,278 filed Jan. 29, 1998 now U.S. Pat. No. 6,210,882.

FIELD OF THE INVENTION

The present invention relates to methods and apparatus for performing rapid and accurate heating and cooling of a sample. More specifically, the present invention relates to methods and apparatus for performing non-contact, rapid and accurate thermocycling on micro to nanoliter volume samples, wherein each cycle can be completed in as little as a few seconds.

BACKGROUND OF THE INVENTION

Numerous analytical methods require that a sample be heated to a particular temperature and then cooled to a particular temperature. Often, sequential heating and cooling steps, known as thermocycling, are required. Various methods involve cycling through two or more stages all with different temperatures, and/or involve maintaining the sample at a particular temperature stage for a given period of time before moving to the next stage. Accordingly, thermocycling of samples can become a time consuming process. In addition, these methods often require the precise control of temperature at each stage of the cycle; exceeding a desired temperature can lead to inaccurate results.

Two factors that are typically important, therefore, in the performance of effective thermocycling on a sample are the speed and homogeneity of the apparatus and methods used. Cycle times are largely defined by how quickly the temperature of the sample can be changed, and relate to the heat source itself and the rate of heat transfer to the sample. Uniformity of sample temperature is important to ensure that reproducible and reliable results are obtained. Typically, increasing cycle speeds makes it harder to maintain homogenous sample temperatures.

The concept of using elevated temperatures to effect chemical, biological and biochemical reactions is commonly known and expressed as the law of Arrhenius. Generally, an increase in temperature of a reaction translates into an increase in the rate of the reaction. Reaction parameters, such as the activation of the reaction, the increase in dissolution of the reaction components, the desolvation of the substrate and the specificity of the catalysis are temperature dependent. Exact or nearly exact maintenance of a reaction temperature is often critical in most biochemical/biological processes to guarantee their successful completion. Therefore, great efforts are made in the daily routine of a chemical/biochemical laboratory to control the temperature conditions during a reaction. It is expected that better temperature control increases the performance of most reactions, for example, increasing the specificity of proteolytic reactions.

There is particular interest in rapid and homogenous thermocycling when performing DNA amplification for the polymerase chain reaction (PCR). PCR is a process by which a single molecule of DNA (or RNA) from an organism can be amplified by a factor of $10^6$ to $10^9$. This procedure requires the repetition of heating and cooling cycles in the presence of an original DNA target molecule, specific DNA primers, deoxynucleotide triphosphates, and DNA polymerase enzymes and cofactors. Heating accounts for a denaturing of the sample while cooling results in annealing of the sample. At a temperature typically between the denaturing and annealing temperatures, extension of the annealed primers using an enzyme occurs to replicate the DNA strand or portion of the strand. Extension of the primer can also occur at the same temperature as annealing, depending on the specifics of the reaction. Each heating/cooling cycle produces a doubling of the target DNA sequence, leading to an exponential accumulation of the target sequence. PCR based technology has been applied to a variety of analyses, including environmental and industrial contaminant identification, medical and forensic diagnostics, and biological research.

There are a number of biochemical reactions that require accurate and rapid thermocycling. Additionally, there are reactions whose specificity can be enhanced when conducted in a rapid and accurate thermocycling environment. The PCR reaction has very high demands on the accuracy of the thermocycling parameters and is, therefore, an ideal assay to test the accuracy of the thermocycling method and apparatus.

U.S. Pat. No. 4,683,202 generally describes the PCR concept, in which a stretch of DNA is copied using a polymerase. Generally, the procedure involves annealing a piece of primer DNA at a first temperature to any stretch of single-stranded DNA template with a complementary sequence. The DNA polymerase copies the primed piece of DNA at a second given temperature. At a third given temperature, the newly copied DNA and the primer dissociate from the template DNA, thereby regenerating single-stranded DNA. The temperature of the sample is returned to the first temperature to allow the primer to attach itself to any strand of single-stranded DNA with a complementary sequence, including the DNA strands that were synthesized in the immediately preceding cycle. In this manner, the template DNA is amplified or reproduced any number of times, depending on how many times the template DNA occurs in the sample, and the number of cycles completed. The procedure can also be performed using RNA.

Most existing methods and techniques of thermocycling in benchtop instrumentation are indirect with respect to the effect of the heating source on the sample. Most thermocycling approaches heat and/or cool a circulating medium, such as water or air, that affects the container which holds the sample and, subsequently, subjects the sample itself to the desired thermocycling process. The rate of the cycling process depends on the effectiveness of the heat transfer between the circulating medium and the sample.

For example, U.S. Pat. No. 5,504,007 discloses a thermocycle apparatus having a body containing a thermally conductive liquid. The liquid is contained within the body of the apparatus, and the temperature of the liquid alternated between lower and higher temperatures in repeating cycles. A well or container for holding a sample of material is held in contact with the liquid and conducts the cyclic temperature changes of the liquid to the sample.

U.S. Pat. No. 5,576,218 discloses a method for thermocycling of nucleic acid assays using a blended fluid stream produced from constant velocity, constant volume, and constant temperature fluid streams. Using these streams, a variable temperature, constant velocity, constant volume fluid stream is introduced into a sample chamber for heating and cooling the samples contained therein. The temperature of the blended fluid stream is varied by diverting and altering the ratio of the constant temperature fluid streams relative to one another.

U.S. Pat. No. 5,508,197 discloses a thermocycling system based on the circulation of temperature controlled water directly to the underside of a thin-walled polycarbonate microtiter plate. The water flow is selected from a manifold fed by pumps from heated reservoirs.

Other methods are reported for heating a sample through use of heated air. U.S. Pat. No. 5,187,084 discloses an apparatus and method for performing thermocycling on a sample using an array of sample containing vessels supported in a reaction chamber, through which air at controlled temperatures is forcibly circulated as a heat-transfer medium in heat exchange relationship with the vessels. The temperature of the air is controlled as a function of time to provide a preselectable sequence defining a temperature profile. The profile is cyclically repetitively reproduced to effect replication of and amplification of the desired sequence of the DNA.

U.S. Pat. No. 5,460,780 discloses a device for rapidly heating and cooling a reaction vessel through various temperatures in PCR amplification utilizing a means for heating at least one side wall of a reaction vessel, means for cooling the heating means at repeated intervals and means for moving the reaction vessel and/or heating and cooling relative to each other. In one embodiment, heated air is used to heat the reaction vessel.

Similarly, U.S. Pat. No. 5,455,175 demonstrates that rapid, non-contact PCR can be accomplished in glass capillaries using air heated by foam lining the chamber in which the capillaries are placed; the foam is heated first by a halogen lamp.

Another common approach for thermocycling is through intimate contact between a reaction vessel holding the reaction medium and a heating block that is rapidly heated and cooled (for example, by using a Peltier element that can both heat and cool). This is the basis of most commercially available PCR instrumentation.

For example, U.S. Pat. No. 5,525,300 discloses an apparatus for generating a temperature gradient across a heat conducting block.

U.S. Pat. No. 5,498,392 discloses chip-like devices for amplifying a preselected polynucleotide in a sample by conducting a polynucleotide polymerization reaction. The devices comprise a substrate microfabricated to define a sample inlet port and a mesoscale flow system, which extends from the inlet port. A polynucleotide polymerization reaction chamber containing reagents for polymerization and amplification of a polynucleotide is in fluid communication with the inlet port. A heat source and, optionally, a cooling source are used to heat and/or cool the chip.

Wilding and co-workers, *Nucleic Acids Res.*, 24:380–385 (1996), demonstrated that PCR could be carried out in a microfabricated silicon glass chip-like chamber. By contacting enclosed 12 microliter reaction chambers microfabricated in glass to a block heater which cycled between two temperatures, they were able to obtain effective and reproducible PCR amplification, as confirmed by removing the PCR product and evaluating it using capillary electrophoresis. Similarly, Northrup and co-workers, *Anal. Chem.*, 68:4081–4086 (1996), accomplished PCR amplification of DNA in a microfabricated silicon PCR device that could be directly interfaced with an electrophoretic chip for PCR product analysis. The device contained disposable polypropylene liners to retain the PCR mixture which could be cycled between two temperatures using polysilicon heaters in direct contact with the PCR chamber and cooled either passively or by air drawn along the heater surfaces of the reaction chamber. The device was interfaced with the electrophoretic chip by forcing it into the 1 mm drilled holes in the electrophoretic chip.

All of the above references, however, describe PCR amplification methods wherein the vessel containing the sample is contacted directly by a heater or another heat source, which transfers heat to the vessel in which the sample is contained. The vessel, in turn, heats the sample. Since these techniques rely on the intimate contact between the circulating medium and the reaction vessel, surface-to-volume ratio of the reaction vessel is of utmost importance to the effectiveness of the heating step; the higher this ratio the better the PCR reaction.

PCT publication WO 96/41864 discloses a diode laser heated microreaction chamber with sample detection means. A heat source, such as an IR or UV source, is used to heat the reagents to a thermally induced chemical reaction. Such heating means can be used, for example, in conjunction with the microfabricated reactor described in U.S. Pat. No. 5,639,423.

None of the above references teach methods and apparatus for performing ultrafast and reliable thermocycling using both a non-contact heating source and a non-contact cooling source. Nor do any of the references appear to teach the sharp and rapid transitions from one temperature to another accomplished by the present invention.

The methods and apparatus described above are further limited with respect to the temperature range and temperature accuracy in which they operate. If the thermocycling devices are cooled in an uncontrolled manner through heat dissipation by convection at ambient temperature, the minimum temperature at which the device can operate is restricted by the ambient temperature. This restriction becomes particularly inconvenient and detracts from the usefulness of the device if the thermocycling of a sample is done in a microdevice in which thermocycling is coupled with a downstream analysis step conducted at a lower temperature.

The possibilities of thermocycling on a device in which thermocycling is achieved using a heating and/or cooling element are predetermined by the initial design of the chip, as the location of the heating and/or cooling element is typically part of the chip itself. Thus, these microdevices use of thermocycling is spatially constrained and the devices are not flexible with respect to the use of heating or cooling on different locations within or at the microdevice structure.

In addition, the design of single-use analyses modules for various diagnostic and monitoring purposes with integrated heating/cooling element, such as those described in U.S. Pat. No. 5,498,392 is very complex, and becomes cumbersome and difficult to use especially when numerous samples are to be tested. Therefore, the inexpensive production of such devices, normally a major advantage of microfabrication technology, is compromised.

There is a need, therefore, for improved methods and apparatus for rapidly heating and cooling analytical samples in a fast and reliable manner with sharp transition periods. There is a further need for such methods and apparatus which are both economical and practical to use.

SUMMARY OF THE INVENTION

The present invention has met the above-described needs, by providing methods and apparatus for the rapid and accurate performance of thermocycling, which are especially suitable for use with small volume samples. The methods involve the direct heating of a sample through optical energy and positively cooling the sample by use of a non-contact cooling source, such as one in which an air stream is directed at the vessel containing the sample. The heating and cooling steps are accomplished by use of a non-contact heat source and a non-contact cooling source, respectively. As used herein, the term "non-contact" refers to heat sources and/or cooling sources that are not in direct contact with the reaction vessel containing the sample to be analyzed.

It will be appreciated by those skilled in the art that the devices described herein are novel in that they combine non-contact heating and non-contact cooling, which can be adapted to a multitude of cycling conditions. In addition, the thermocycling can be directed to structural different sections within a microdevice without spatial constraints.

Optical energy is generated using an IR source that is not in direct contact with the sample vessel. The optical energy provided by the IR source is easily and accurately manipulated so that the intensity of the optical energy directed towards the sample can be finely tuned and controlled so that the desired temperature is achieved and maintained. The transition from one to another temperature in IR-mediated heating is achieved more rapidly than with conventional thermocycling methods. Heating by optical energy mainly affects the sample itself, rather than the container of the sample and/or its environment. The IR-mediated heating is primarily achieved through the absorbance of irradiation by molecules of the sample, for example, the water molecules in the sample. The heating step can involve heating to one temperature, or two or more different temperatures depending on the desired application of the user.

Positive cooling is accomplished by use of a non-contact cooling source directed at the vessel containing the sample. Cooling, like heating, can be accomplished through any number of steps, with a different temperature being maintained at each step.

It may also be desirable to maintain or hold the sample at a particular temperature for a given length of time prior to heating or cooling the sample to a different temperature. Such hold time is referred to herein as "dwell time". The heating and cooling steps, and the dwell time, if any, can be sequentially repeated to perform the desired number of thermocycles. According to the methods of the present invention, each ultrafast thermocycle can be accomplished in only a few seconds.

It is therefore an object of the present invention to provide methods and apparatus for performing rapid thermocycling on an analytical sample.

The present invention is also directed to apparatus for carrying out these methods.

Another object of the invention is to provide methods and apparatus that do not allow a predetermined, upper temperature to be exceeded.

It is another object of this invention to provide methods and apparatus for rapidly and accurately varying the temperature of a sample in accordance with a predetermined temperature profile.

Another object of the invention is to provide methods and apparatus having high precision control of thermocycling parameters.

Another object of the invention is to provide methods and apparatus for performing rapid thermocycling on microliter and nanoliter volume samples.

Yet another object of the present invention is to provide a means for performing PCR under optimal thermal conditions.

Another object of the present invention is to provide methods and apparatus that provide non-contact heating and cooling sources to conduct thermocycling of samples.

Another object of the invention is to teach a method that allows thermocycling of samples within an existing channel structure, for example a sample plug in a separation channel.

Another object of the invention is to provide methods and apparatus for performing rapid and reliable repeated thermocycles over many cycles of amplification.

It is another object of the invention to provide automated methods and apparatus for performing rapid and reliable thermocycling.

Another object of the present invention is to mediate the flow of a sample on a microchip using an IR source.

These and other objects of the invention will be apparent from the following description of the invention.

BRIEF DESCRIPTION OF THE DRAWINGS

FIG. 1A depicts a portion of a microchip used in the methods and apparatus of the present invention for use with microchannel thermocycling. FIG. 1B depicts a portion of a microchip used in the methods and apparatus of the present invention having a widened microchannel. FIG. 1C is a top plan view of the upper layer of FIG. 1A. FIG. 1D is a cross section taken through line 1D—1D of FIG. 1A.

FIG. 5B provides an exploded, front view of the sample containing vessel and the thermocouple device.

FIG. 7A shows the thermocycling profiles obtained with 94° C./54° C./72° C. dwell times of 30 sec/30 sec/60 sec; FIG. 7B shows thermocycling profiles obtained with 94° C./54° C./72° C. dwell times of 2 sec/2 sec/4 sec; FIG. 7C shows an exploded view of some cycles shown in FIG. 7B; and FIG. 7D is an exploded view of one thermocycle shown in FIG. 7A.

FIG. 11A outlines the temperature profile generated through cycling between 94° C. for 15 sec and 68° C. for 60 sec and FIG. 11B indicates the product obtained after a successful PCR mediated amplification of the lambda DNA sequence using the CE analysis method described in Example 5.

DETAILED DESCRIPTION OF THE INVENTION

Figure 2:
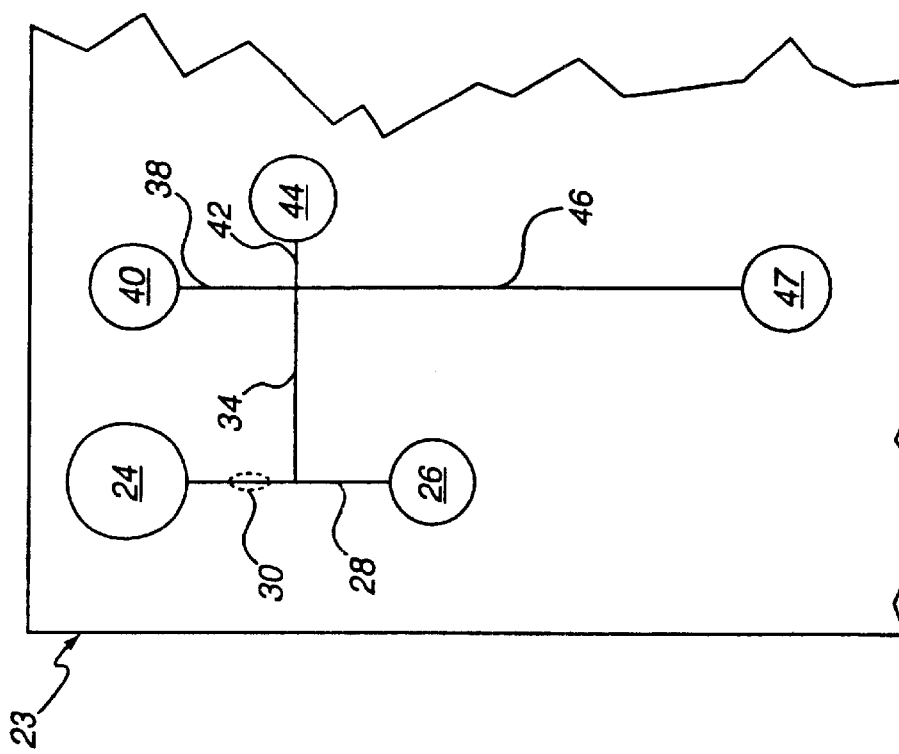
FIG. 2 depicts a schematic of a portion of a microchip used in the methods and apparatus of the present invention for use with microchannel thermocycling.

The present invention is generally directed to a method for performing rapid and accurate thermocycling on a sample comprising placing the sample in a suitable reaction vessel; heating the sample to a desired temperature using the optical energy of a non-contact heat source that directly heats the sample itself; positively cooling the sample to a desired temperature by a non-contact cooling source directed at the reaction vessel; and sequentially repeating the heating and cooling steps to perform a desired number of thermocycles.

Applications of the thermocycling method of the present invention are numerous and generally encompass any analytical system in which the temperature of a sample is regulated and/or changed. The present invention is particularly applicable to analytical systems wherein fast or ultrafast transition from one temperature to the next is needed, and in which it is important that exact or nearly exact temperatures be achieved.

For example, the present methods are suitable for testing and incubation and treatment of biological samples typically analyzed in a molecular biology laboratory or a clinical diagnostic setting. The accuracy of the thermocycling method of the present invention makes it particularly suitable for use in nucleic acid replication by the polymerase chain reaction (PCR). Any reaction that benefits from precise temperature control, rapid heating and cooling, continuous thermal ramping or other temperature parameters or variations can be accomplished using this method discussed herein. Other applications include, but are not limited to, the activation and acceleration of enzymatic reactions, the deactivation of enzymes, the treatment/incubation of protein-protein complexes, DNA-protein complexes, DNA-DNA complexes and complexes of any of these biomolecules with drugs and/or other organic or inorganic compounds to induce folding/unfolding and the association/dissociation of such complexes. The following applications illustrate the usefulness of the present thermocycling apparatus and methods, representing only some of the possible applications.

A common procedure in the protocols of molecular biology is the deactivation of proteins through heat. One of the most basic procedures in molecular biology is the cleavage of proteins and peptides into discrete fragments by proteases/digestion enzymes, such as trypsin. A thermocycling procedure is typically used to activate the enzyme at an elevated temperature followed by: the incubation of the enzyme during the reaction to sustain the enzymatic catalysis; the heat inactivation of the enzyme; and the final treatment/analysis at ambient temperature. Typically, the reaction components are incubated at 40° C. for 60 min until the reaction is completed, after which the enzyme activity has to be stopped to avoid unspecific cleavage under uncontrolled conditions. Many enzymes, such as trypsin, can be irreversibly inactivated by incubation for 10 min at higher temperature, such as 95° C. The sample is then cooled back to ambient temperature and ready for downstream analysis. Such deactivation of enzymes is taught, for example, in *Sequencing of proteins and peptides: Laboratory Techniques in Biochemistry and Molecular Biology*, ed. G. Allen, pages 73–105.

The same principle of heat inactivation can be used to inactivate restriction endonucleases that recognize short DNA sequences and cleave double stranded DNA at specific sites within or adjacent to the recognition sequence. Using the appropriate assay conditions (for example, 40° C. for 60 min) the digestion reaction can be completed in the recommended time; the reaction is stopped by incubation of the sample at 65° C. for 10 min. Some enzymes may be partially or completely resistant to heat inactivation at 65° C., but they may be inactivated by incubation for 15 min at 75° C. Such methods are taught, for example, by Ausubel et al. *Short Protocols in Molecular Biology*, 3rd Ed., John Wiley & Sons, Inc. (1995) and *Molecular Cloning: A Laboratory Manual*, J. Sambrook, Eds. E. F. Fritsch, T. Maniatis, 2nd Ed.

Similar to the heat inactivation of proteins for the control of enzymatic activity, the sample processing of proteins for electrophoretic analysis often requires the denaturation of the protein/peptide analyte before the separation by electrophoretic means, such as gel electrophoresis and capillary electrophoresis, takes place. For example, a 5 min heat denaturation (which provides for the destruction of the tertiary and secondary structure of the protein/peptide) at 95° C. in an aqueous buffer in the presence or absence of denaturing reagents, such as SDS detergent, allows the size dependent separation of proteins and peptides by electrophoretic means. This is taught, for example, in *Gel Electrophoresis of Proteins: A Practical Approach*, Eds. B. D. Hames and D. Rickwood, page 47, Oxford University Press (1990).

Thermocycling of samples is also used in a number of nonenzymatic processes, such as protein/peptide sequencing by hydrolysis in the presence of acids or bases (for example, 6M HCl at 110° C. for 24 hours) into amino acids. Studies involving the investigation of the interaction of biomolecules with drugs and/or drug candidates are frequently conducted under conditions requiring precise temperature control to obtain binding characteristics, such as kinetic association/dissociation constants.

These applications for the thermocycling taught by the present invention will find use, for example, as a diagnostic tool in hospitals and laboratories such as for identifying specific genetic characteristics in a sample from a patient, in biotechnology research such as for the development of new drugs, identification of desirable genetic characteristics, etc., in biotechnology industry-wide applications, and in scientific research and development efforts.

Thus, the samples subjected to the thermocycling methods of the present invention will vary depending on the particular application for which the methods are being used. Samples will typically be biological samples, although accurate heating and cooling of non-biological samples is equally within the scope of this invention. As used herein, the term "samples" further refers to volumes in the microliter to nanoliter range.

A suitable reaction vessel according to the methods of the present invention is one in which extremely low volumes of sample can be effectively tested, including sample volumes in the nanoliter range. The sample vessel must be made of a material that allows the penetration of IR light wavelengths, such as quartz glass, glass, silicon, transparent plastics, and the like. Preferably, the reaction vessel or container will have a high surface-to-volume ratio. A high surface-to-volume ratio leads to a decrease in the thermal time constant, which can lead to an increase in the efficiency of the thermocycling. A high surface-to-volume ratio, while not as important for the heating step, is related to the effectiveness of the cooling step. Various examples of suitable reaction vessels can be given, including but not limited to, microchambers, capillary tubes, microchips and microtiter plates.

A preferred example of a suitable reaction vessel is a microchamber made from thin-walled glass. Another preferred embodiment is a glass capillary tube. Such capillaries are typically used in capillary electrophoresis ("CE"). Suitable inner diameters of the capillaries having an outer diameter of about 370 µm typically vary between about 15 µm and 150 µm. Thermal gradients that lead to convection are substantially reduced in capillary tubes. Glass capillary tubes are commercially available from Polymicron Technologies, Phoenix, Ariz.

Another preferred example of a suitable reaction vessel is the channel structure incorporated into a microfabricated device, such as the microfabricated substrate described by Wilding and co-workers in *Nucleic Acids Res.*, 24:380–385 (1996). Other reaction vessels with characteristics suitable for rapid thermocycling are shown in FIGS. 6A–6D, comprising an entrenched reservoir attached or incorporated into a microfabricated chip device.

One preferred embodiment of a microchip for use in the present invention is illustrated in FIGS. 1A, 1B, 1C and 1D. It will be appreciated that FIGS. 1A–1D depict only a portion of the chip, and that the depiction is not drawn to scale. FIG. 1A depicts a corner of a microchip 2 having a glass upper portion or layer 4 and a glass lower portion or layer 6 wherein the upper and lower layers fit together, for example, through bonding by high temperature. Upper layer 4 contains an upwardly open sample reservoir 8 and an upwardly open waste reservoir 10. A "window" 12 provided in upper layer 4 allows for direct heating of the sample by an IR source. It will be understood that window 12 can be provided in a number of ways. For example, the "window" can merely be a portion of the upper layer 4 of substantially full thickness of the upper layer 4, or can be an area which has been made thinner with respect to adjacent portions of the upper layer 4 by means known in the art, such as etching. A window 12 is more clearly depicted in FIG. 1D, which is a cross section view taken along line 1-D of FIG. 1A when the upper layer 4 and lower layer 6 are fitted together. Returning to FIG. 1A, a microchannel 14 is provided in the lower layer 6, and the area where a PCR reaction occurs is generally depicted by the elliptical area 16. FIG. 1B shows essentially the same portion of a microchip as shown in FIG. 1A, only having a widened microchannel 18 that has a greater volume than microchannel 16 of FIG. 1A. FIG. 1C is a top plan view of the upper layer 4 of microchip 2 of FIG. 1A, showing sample reservoir 8 and waste reservoir 10 and window 12. In FIG. 1D, upper layer 4 is shown having sample reservoir 8 and waste reservoir 10 and window 12. Lower layer 6 is shown having microchannel 14. A second microchannel 20 connects sample reservoir 8 and microchannel 14. A third microchannel 22 connects microchannel 14 and waste reservoir 10. FIGS. 1C and 1D are not drawn to scale with respect to FIG. 1A. It will be understood that the microchip shown in FIGS. 1A–1D can also be made of plastic or any other material that could be penetrated by IR light wavelengths. In such an embodiment, the upper and lower layers could be fit together, for example, by a UV curing process, and the window could be formed by electroforming during fabrication of the upper layer.

FIG. 2 depicts a larger corner 23 than FIGS. 1A–1D of a microchip for use with the present invention. The sample reservoir 24 and a first waste reservoir 26 are both connected to a first microchannel 28. The elliptical area 30 generally represents the area where the PCR reaction occurs. Microchannel 28 can be, for example, 50 µm width×30 µm depth, although other dimensions are equally within the scope of the present invention. Microchannel 28 is connected to a second microchannel 34. The second microchannel 34, a third microchannel 38 coming from inlet reservoir 40, and a fourth microchannel 42 coming from a second waste reservoir 44, are in communication with each other and form a fifth microchannel 46 that leads to an outlet reservoir 47 for delivery of the sample to the next processing stage or storage, as desired.

Any other reaction vessel, such as a microtiter plate, can be used according to the methods of the present invention, provided that the vessel is made of a material which allows IR radiation to directly heat the sample and has a surface-to-volume ratio sufficient to allow for cooling within the time parameters discussed below. A method for preparing a suitable microfabricated device is discussed in the example section. Further guidance in preparing such microfabricated device is provided, for example, in U.S. Pat. Nos. 5,250,263; 5,296,114; Harrison et al., *Science* 261:895–897 (1993); and McCormick et al., *Anal. Chem.*, 69:2626–2630 (1997).

Heating of the sample is accomplished through the use of optical energy from a non-contact heat source. Preferably, this optical energy is derived from an IR light source which emits light in the wavelengths known to heat water, which is typically in the wavelength range from about 0.775 µm to 7000 µm. For example, the infrared activity absorption bands of sea water are 1.6, 2.1, 3.0, 4.7 and 6.9 µm with an absolute maximum for the absorption coefficient for water at around 3 µm. The IR wavelengths are directed to the vessel containing the sample, and because the vessel is made of a clear or translucent material, the IR waves act directly upon the sample to cause heating of the sample. Although some heating of the sample might be the result of the reaction vessel itself absorbing the irradiation of the IR light, heating of the sample is primarily caused by the direct action of the IR wavelengths on the sample itself.

In a preferred embodiment, the optical energy is focused on the sample by means of IR transmissible lenses so that the sample is homogeneously irradiated. This technique avoids "hotspots" that could otherwise result in the creation of undesirable temperature differences and/or gradients, or the partial boiling of the sample. The homogeneous treatment of the sample vessel with optical energy therefore contributes to a sharper temperature profile. The homogenous sample irradiation can further be enhanced through the use of a mirror placed on the opposite site of the IR source, such that the reaction vessel is placed between the IR source and the mirror. This arrangement reflects the radiation back onto the sample and substantially reduces thermal gradients in the sample. Alternatively, the radiation can be delivered by optical IR-transparent fiberglass, for example, optical fiberglass made from waterfree quartz glass (Fasertyp IR-QQ, Schott Glaswerke Wiesbaden, Germany) that is positioned around the reaction vessel and that provides optimal irradiation of the sample.

Heating can be effected in either one step, or numerous steps, depending on the desired application. For example, a particular methodology might require that the sample be heated to a first temperature, maintained at that temperature for a given dwell time, then heated to a higher temperature, and so on. As many heating steps as necessary can be included.

Similarly, cooling to a desired temperature can be effected in one step, or in stepwise reductions with a suitable dwell time at each temperature step. Positive cooling is preferably effected by use of a non-contact air source that forces air at or across the vessel. Preferably, this air source is a compressed air source, although other sources could also be used. It will be understood by those skilled in the art that positive cooling results in a more rapid cooling than simply allowing the vessel to cool to the desired temperature by heat dissipation. Cooling can be accelerated by contacting the reaction vessel with a heat sink comprising a larger surface than the reaction vessel itself; the heat sink is cooled through the non-contact cooling source. The cooling effect can also be more rapid if the air from the non-contact cooling source is at a lower temperature than ambient temperature.

Accordingly, the methods of the present invention provide for the use of virtually any temperature profile/dwell time necessary. For example, cleavage of proteins through use of proteases or digestion enzymes might require use of different temperatures, each of which must be precisely maintained for various amounts of time. Activation of restriction endonucleases might similarly require achieving and maintaining two or three different temperatures. Protein or peptide sequencing can require the steady maintenance of a high temperature for an extended period of time.

The PCR reaction typically involves heating a sample to between about 90 and 96° C., cooling the sample to between about 40 and 60° C., and heating the sample to between about 70 and 75° C. It will be appreciated by those skilled in the art that this temperature profile is just a generalization, and that optimum temperatures or temperature ranges for each stage of the PCR reaction must be determined based upon the particular reaction being run. These optimal temperatures will vary depending on such factors as the particular DNA or RNA being replicated, the number of cytosine-guanine hydrogen bonds versus the number of adenosine-thymine hydrogen bonds, the enzyme being used, the length of the primer and other variables, the effect of which can be determined by those skilled in the art. Precise maintenance of these optimum temperatures or temperature ranges is important to ensure that reliable results are obtained; deviation from the optimal temperature or temperatures can effect the reaction in numerous ways. For example, while the temperature at which DNA denatures is generally between about 90 and 96° C., insufficient heating during the denaturation step is a common reason for a PCR reaction to fail. Similarly, overheating of the sample during denaturation can result in excessive denaturation of the polymerase or other enzyme being used.

Achieving the optimal temperature for the PCR annealing step is even more critical. An annealing temperature which is too low will result in non-specific DNA fragments being amplified. At an annealing temperature which is too high, the primers will anneal less efficiently resulting in decreased yield of the desired product and possibly reduced purity.

Achieving the optimal temperature for the extension reaction is also important for obtaining the desired PCR result. Temperature may affect both the rate and accuracy of the extension reaction. If the rate of the polymerase reaction is too slow, then the newly synthesized polynucleotide may not contain a site for primer annealing. Additionally, the denatured polynucleotide sequence for amplification may contain one or more regions of secondary structure that may form or disappear according to the temperature selected. Furthermore, several different enzymes with polymerase activity may be used for PCR. Each enzyme will have its own optimum temperature for activity, stability and accuracy.

Thus, the determination of optimum temperatures for PCR, enzyme activation, protein denaturation/renaturation, protein folding and/or unfolding, protein or peptide sequencing and the other reactions requiring thermocycling becomes important to ensure the success of such reactions. Also important is the ability to accurately achieve and maintain these temperatures. Temperature parameters become even more important when dealing with very small volumes of sample. For example, when using the microliter or nanoliter volumes contemplated by the present invention for PCR, a very specific reaction is needed; even a small percentage of non-specific reactions can lead to inaccurate results, and/or a misinterpretation of the results. Temperature variations during the measurements of physiochemical parameters through thermocycling, for example kinetic dissociation/association constants of drug-biomolecular complexes, can lead to the inaccurate assessment of such parameters. A complete failure of a temperature dependent process is likely if the process that requires a temperature dependent activation/inactivation is maintained at suboptimal temperature conditions, for example, heat inactivation of enzymes.

However, it is known to the people skilled in this art that prelonged exposure of most biochemicals and biomolecules to elevated temperatures, for example, temperatures greater than 37° C. for most enzymes, results in their rapid, irreversible inactivation and/or destruction through denaturation, hydrolysis or dissociation. Therefore, any unnecessary temperature elevation, such as those experienced with slow temperature transitions, should be avoided.

A further contributor to inaccurate PCR results arises from the inability to perform rapid and sharp transitions between temperatures. For example, a lag time between the denaturation temperature and the annealing temperature can result in unspecific annealing. Long transition times between denaturation and annealing also promote the premature inactivation of the polymerase enzyme (Taq-enzyme) resulting in a less specific reaction and in a lower product yield. According to the methods of the present invention, such a cycle can be completed in approximately 17 seconds.

Sharp temperature transitions are equally important for reactions involving some proteases and peptidases. It is known that loss of specificity in the protease activity occurs when these enzymes experience slow temperature transitions. Rapid changes in temperature are also beneficial in the folding process of proteins. Shallow temperature gradients are associated with incorrect folding and the increase in partially folded peptide chains, which will either not function or will behave in a dysfunctional manner.

As many cycles as necessary can be performed to achieve the desired result, such as the desired level of DNA amplification, the desired level of enzyme activation or the desired protein folding and/or unfolding. The time for each cycle will vary depending on numerous factors, such as the amount of volume in the sample, the temperatures between which the sample is being cycled, the number of different temperatures in each cycle and the particular application for which the thermocycling is being performed. A small volume sample that is cycled between two relatively close temperatures can be performed in less than one second. The larger the volume, and/or the larger the temperature differential or number of different temperature steps, the longer the cycle time. Effective cycling time between three temperatures can be achieved, with dwell times at each temperature, of 17 seconds or less. This would be suitable for the PCR application.

Other applications, it will be appreciated, require only one cycle through two or more different temperatures. Rapid transition between temperatures and the precise maintenance of each temperature for the desired length of time are important parameters that are addressed by the present invention.

The present methods and apparatus utilize both a non-contact heat source and a non-contact cooling source. The non-contact approach allows for rapid thermocycling, which can be achieved as quickly as 1 second or less. The present thermocycling methods are further characterized as being accurate, in that very precise temperature control can be achieved. That is, an optimum temperature can be selected, and this temperature can be achieved on each and every cycle within ±0.5° C. Perhaps most importantly, the non-contact approach used herein essentially eliminates lengthy time lags between temperature stages, allowing for very sharp temperature transitions.

In addition, the present methods and apparatus are both economical and convenient. The IR sources of the preferred embodiment, the IR lamps, are inexpensive, readily obtained and are easy to use. In addition, because of the non-contact heating and cooling sources, the reaction vessel is the only part of the apparatus that needs to be changed with each sample. These vessels are typically very inexpensive to purchase or prepare. Thus, rapid and accurate thermocycling of numerous samples can be performed in an economic manner.

Figure 3A:
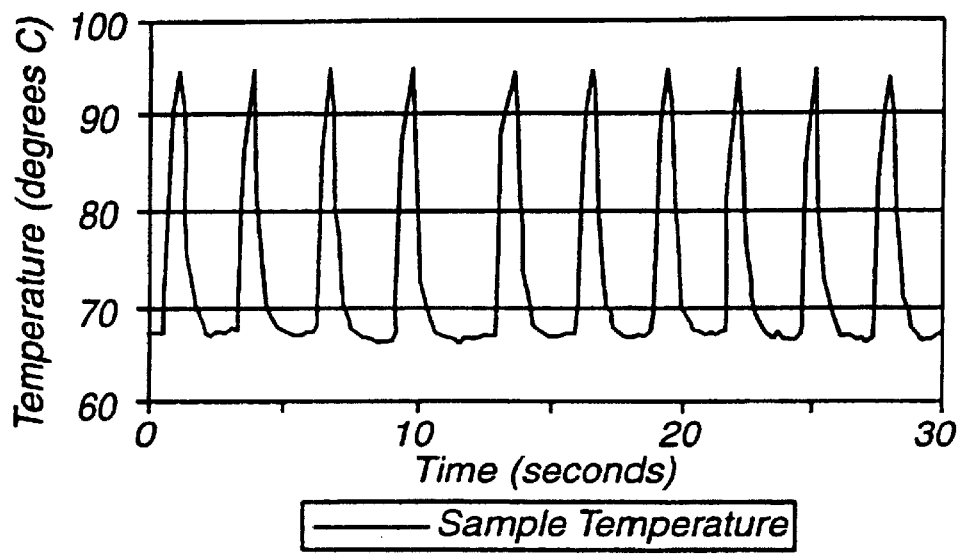
FIG. 3A shows the temperature versus time in ten thermocycles performed according to the present invention.
Figure 3B:
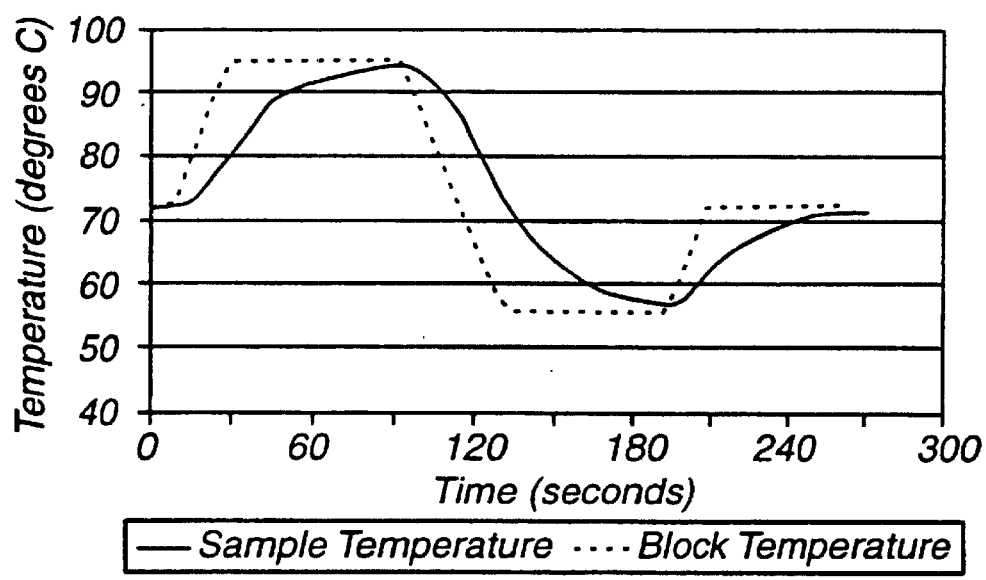
FIG. 3B shows the temperature measured in the heating/cooling block of a conventional benchtop PCR thermocycler (dotted line) and the corresponding temperature in a PCR sample being heated and cooled by the block (solid line).

FIG. 3A shows a plot of temperature versus time (seconds) in ten thermocycles run according to the present invention, in which two temperature stages are achieved. The amount of time that elapses between the highest temperature and the lower temperature is very small, with the temperature change being effected in about 1 second or less. Similarly, the change from the lowest temperature back to the highest temperature takes generally less than one second, and can be done as quickly as 300 to 400 milliseconds. In contrast, FIG. 3B is representative of a typical temperature profile for one three-temperature thermocycle obtained from a commercially available thermocycling instrument. The dotted line represents the temperature of the heating/cooling block of the apparatus, and the solid line the temperature of the sample. It can be seen that the time lags between temperatures—the highest to lowest temperature about 30 seconds, the lowest to intermediate temperature about 15 seconds, and the intermediate to highest temperature about 25 seconds—is sufficiently longer than that achieved by the methods and apparatus of the present invention. Desired temperature changes in the sample itself take even longer to achieve. The temperature transitions in the sample are not nearly as sharp as those obtained in the block, or those in the sample according to the present methods. More specifically, the temperature transition of the sample from the highest to lowest temperature takes about 100 seconds, and from the intermediate to highest temperature about 80 seconds. This time lag becomes important in certain reactions where improper temperatures can lead to inaccurate results. For example, during the lag time between the highest and lowest temperature in PCR, unspecific annealing can occur which can render the results obtained meaningless.

The present invention is also directed to an apparatus for performing thermocycling on a sample comprising a suitable reaction vessel for containing the sample; optical energy, non-contact means for directly heating the sample to a desired temperature; non-contact means for positively cooling the sample to a desired temperature; means for monitoring the temperature of the sample; and means for controlling the heating and cooling of the sample.

Any suitable reaction vessel as described above can be used in the apparatus of the present invention.

The non-contact means for directly heating the sample can be any means known in the art for generating the desired range of wavelengths in the near IR wavelengths. Typically, the heating means will be an IR source, such as an IR lamp, an IR diode laser or an IR laser. An IR lamp is preferred, as it is inexpensive and easy to use. Preferred IR lamps are halogen lamps and tungsten filament lamps. Halogen and tungsten filament lamps are powerful, and can feed several reactions running in parallel. A tungsten lamp has the advantages of being simple to use and inexpensive, and almost instantaneously (90% lumen efficiency in 100 msec) reach very high temperatures. Such lamps are commercially available from General Electric, Cleveland, Ohio. A particularly preferred lamp is the CXR, 8V, 50 W tungsten lamp available from General Electric. This lamp is inexpensive and convenient to use, because it typically has all the optics necessary to focus the IR radiation onto the sample; no expensive lens system/optics will typically be required.

The IR source is positioned remotely (non-contact) from the sample, such that light emanating from the lamp impinges the sample. In one embodiment, the lamp is positioned remotely to the actual sample, and the radiation from the lamp is transferred via optically IR-transmissible fiberglass or through a combination of lenses and mirrors. Other embodiments in which the sample is placed in the path of the IR light source are equally within the scope of the present invention.

The heat source can be manipulated, such as through the use of lenses and filters mounted between the lamp and the reaction vessel. Such lenses and filters would serve to focus the radiation as well as to eliminate wavelengths that could interfere with the reaction taking place and/or the temperature sensing. Filtering and focussing of the IR light using, for example, IR transmissible lenses or filters is preferred, as this reduces the occurrence of temperature gradients in the sample or partial boiling of the sample.

As used herein, the terms "direct" or "directly" when used in reference to heating means that the sample itself is heated by the heating means, such as through absorption of IR radiation, as opposed to heating of the vessel containing the sample which in turn heats the sample. Direct heating of the sample is therefore achieved even when lenses, filters and the like are used.

The apparatus of the present invention uses finely tuned temperature ramping, which allow for rapid heating cycles of the sample. In addition, heat transfer problems frequently encountered with solid block heaters are eliminated with the non-contact approach of the present invention.

The heater can be powered by any means, such as a low voltage power supply. Preferred is a 5 volt DC supply system, although it will be understood that any other suitable means can also be employed.

Cooling can be achieved by any non-contact means known in the art for positively cooling an object. Accordingly, the non-contact cooling source should also be positioned remotely to the sample or reaction vessel, while being close enough to effect the desired level of heat dissipation. Both the heating and cooling sources should be positioned so as to cover the largest possible surface area on the sample vessel. The heating and cooling sources can be alternatively activated to control the temperature of the sample. It will be understood that more than one cooling source can be used.

Positive cooling of the reaction vessel dissipates heat more rapidly than the use of ambient air. The cooling means can be used alone or in conjunction with a heat sink. A particularly preferred cooling source is a compressed air source. Compressed air is directed at the reaction vessel when cooling of the sample is desired through use, for example, of a solenoid valve which regulates the flow of compressed air at or across the sample. The pressure of the air leaving the compressed air source can have a pressure of anywhere between 10 and 60 psi, for example. Higher or lower pressures could also be used. The temperature of the air can be adjusted to achieve the optimum performance in the thermocycling process. Although in most cases compressed air at ambient temperature can create enough of a cooling effect, the use of cooled, compressed air to more quickly cool the sample, or to cool the sample below ambient temperature might be desired in some applications.

A means for monitoring the temperature of the sample, and a means for controlling the heating and cooling of the sample, are also provided. Generally, such monitoring and controlling is accomplished by use of a microprocessor or computer programmed to monitor temperature and regulate or change temperature. An example of such a program is the Labview program, available from National Instruments, Austin, Tex. Feedback from a temperature sensing device, such as a thermocouple, is sent to the computer. In one embodiment, the thermocouple provides an electrical input signal to the computer or other controller, which signal corresponds to the temperature of the sample. Preferably, the thermocouple, which can be coated or uncoated, is placed in a temperature sensing reaction vessel placed adjacent to the reaction vessel containing the sample to be tested. The temperature sensing reaction vessel should be of the same type as the sample containing reaction vessel, only containing a blank, such as water or a buffer solution instead of sample. Alternatively, the thermocouple can be placed directly into the sample vessel, provided that the thermocouple does not interfere with the particular reaction or affect the thermocycling, and provided that the thermocouple used does not act as a heat sink. A suitable thermocouple for use with the present invention is constantan-copper thermocouple. In some instances it might be an advantage to sense the sample temperature through a thermosensor directly measuring the reaction vessel, or the sample itself.

In another embodiment, temperature is monitored and controlled through a remote temperature sensing means. For example, a thermo-optical sensing device can be placed above an open reaction vessel containing the sample being thermocycled. Such a device can sense the temperature on a surface, here the surface of the sample, when positioned remotely from the sample.

Signals from the computer, in turn, control and regulate the heating and cooling means, such as through one or more switches and/or valves. The desired temperature profile, including dwell times, is programmed into the computer, which is operatively associated with heating and cooling means so as to control heating and cooling of the sample based upon feedback from the thermocouple and the predetermined temperature profile.

Figure 4:
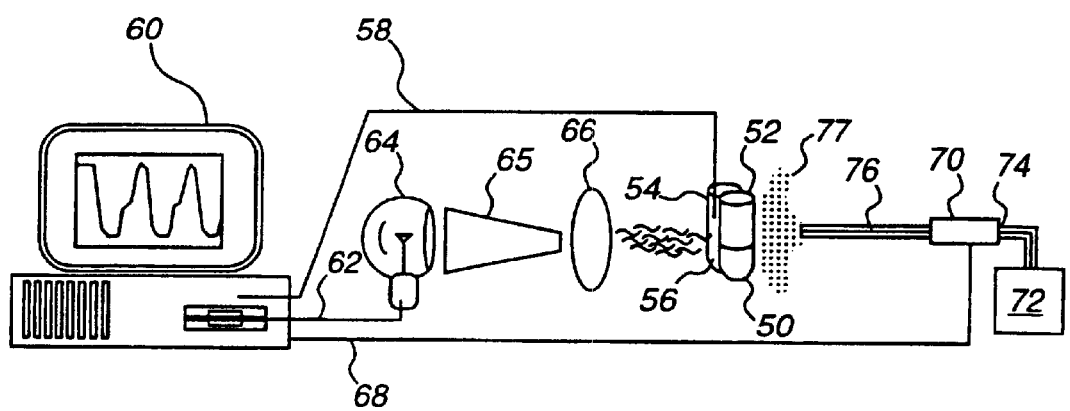
FIG. 4 illustrates one embodiment of the apparatus of the present invention.

A preferred embodiment of the present apparatus, usable for example in PCR, is depicted in FIG. 4. The sample to be tested 50 is placed in a suitable reaction vessel 52 made of glass. Adjacent to the sample containing vessel 52 is a generally identical vessel 54 containing a blank 56, such as a PCR buffer solution. A thermocouple 58 is submerged in the blank 56 at one end and is operatively associated with a computer 60 or other microprocessor at the other end. It will be understood that vessel 52 and vessel 54 are side by side, such that the IR light 65 originating from lamp 64 impinges generally equally on vessels 52 and 54, as does the air 77 from compressed air source 72. An electrically conductive wire 62 connects computer 60 to lamp 64 with the computer 60 turning the lamp on when heating is desired and off when the desired temperature is achieved in the blank 56. A filter 66 serves to absorb light 65 emitted from the lamp 64 that might interfere with the reaction in sample 50. An electrically conductive wire 68 runs from computer 60 to a computer controlled solenoid valve 70. Solenoid valve 70 controls the volume of air coming from compressed air source 72 through tube 74 when cooling of the sample is desired. Compressed air passes through solenoid valve 70 into tubing 76 and emerges 77 at reaction vessel 52 containing the sample 50 being thermocycled and the vessel 54 containing blank 56.

Figure 5A:
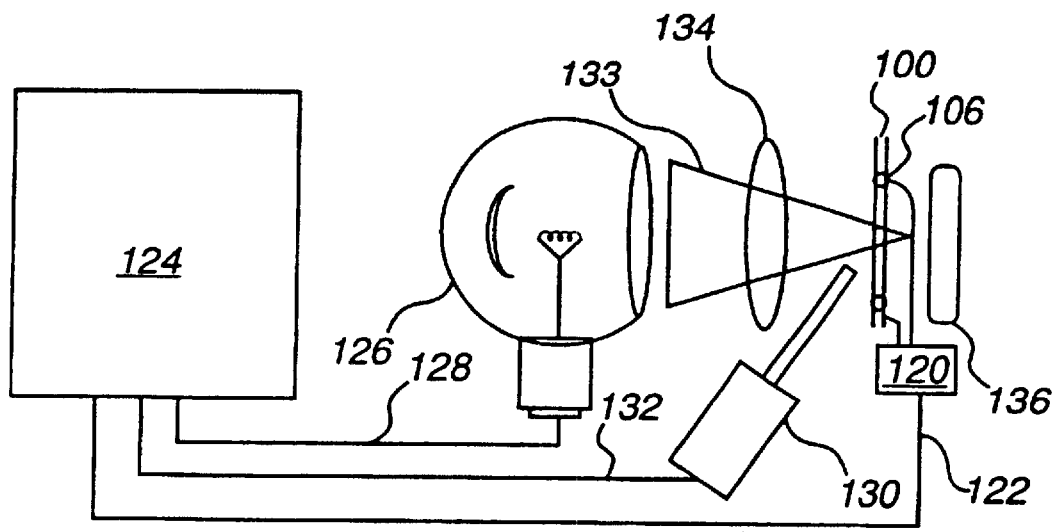
FIGS. 5A and 5B illustrate one embodiment of the apparatus of the present invention using a thermocouple in a sealed capillary.
Figure 5B:
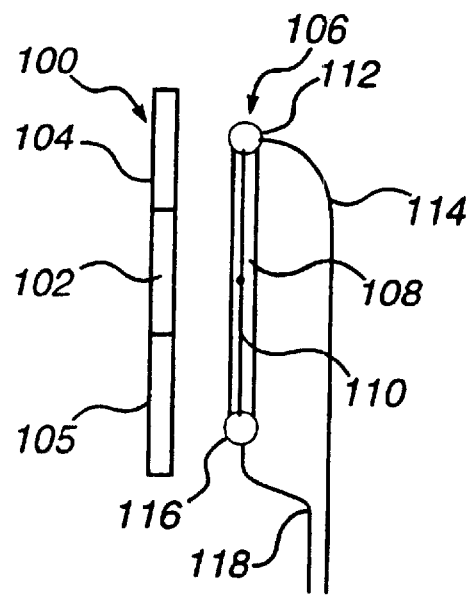

FIGS. 5A and 5B illustrate another embodiment 6f the apparatus of the present invention. FIG. 5B is an exploded view of FIG. 5A, showing capillary 100 which contains PCR mix 102 and solvent 104 and 105, and a temperature-sensing sealed capillary 106. Sealed capillary 106 contains PCR buffer 108 and thermocouple 110, which extends through sealed end 112 as electrically conductive wire 114 and through sealed end 116 as electrically conductive wire 118. More specifically, FIG. 5B shows a front view of capillary 100 and sealed capillary 106, and generally represents the view that would be seen looking from the direction of lamp 126 toward capillary 100 and sealed capillary 106. Electrically conductive wires 118 and 114 combine at reference junction 120, as shown in FIG. 5A. Capillary 110 and sealed capillary 106 are at equal distance with respect to lamp 126, and horizontally oriented. With further reference to FIG. 5A, extending from reference junction 120 is electrically conductive wire 122, connected to microprocessor 124. Through feedback from the thermocouple 110, microprocessor 124 controls lamp 126 through electrically conductive wire 128, and compressed air source 130 through electrically conductive wire 132. Filter 134 removes selected wavelengths from the light 133 emerging from lamp 126. A mirror 136 reflects the radiation from lamp 126 back onto capillary 100 and sealed capillary 106. Use of this embodiment is further described in Example 5 below.

Figure 6A:
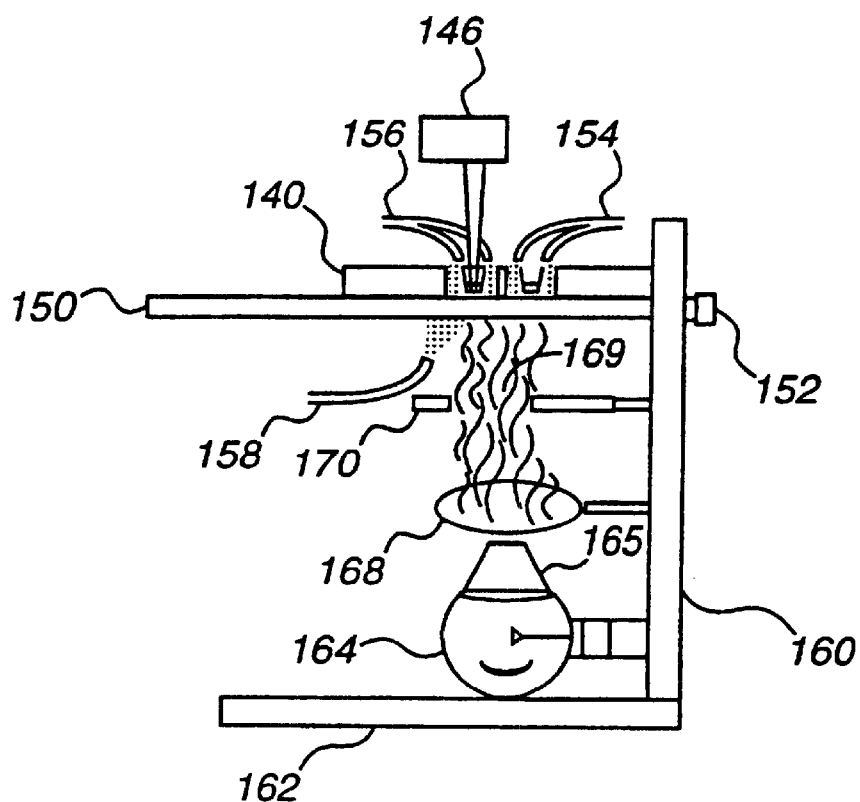
FIGS. 6A–6D illustrate embodiments of the apparatus of the present invention using a microchip with an entrenched reservoir, with a dummy cell (FIGS. 6A and 6B) or with remote temperature sensing (FIGS. 6C and 6D).
Figure 6B:
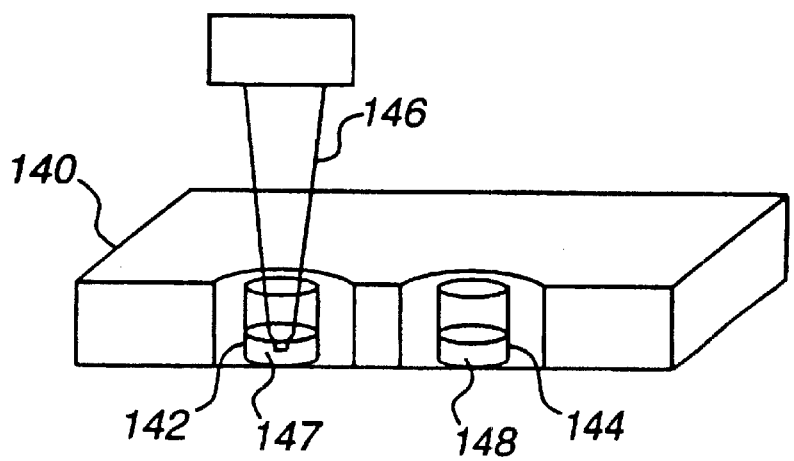

FIGS. 6A–6D depict two additional embodiments, in which one or more entrenched reservoirs are used. FIGS. 6A and 6B show the apparatus of the present invention in which microchip 140 contains a first entrenched reservoir 142 and a second entrenched reservoir 144, shown more clearly in the exploded view of FIG. 6B. The first entrenched reservoir 142 contains a thermocouple 146 and a blank solution 147, such as PCR buffer. The second entrenched reservoir 144 contains sample 148. As shown in FIG. 6A, microchip 140 is placed on a movable stage 150, which may be generally ring-like to leave the underside of microchip 140 exposed, and which can be motorized or moved manually using knob 152. Cooling jets 154 and 156 are directed around entrenched reservoirs 142 and 144, and cooling jet 158 is directed underneath reservoirs 142 and 144. Stage 150 is secured to a vertical leg 160 of a generally "L" shaped housing, and generally parallel to the lower portion 162. Lamp 164 has its emitted light 165 filtered by filter 168. The light 165 to which entrenched reservoirs 142 and 144 are exposed is further limited by aperture 169 in light restricting means 170. It will be appreciated that stage 150 is a frame that supports microchip 140 on its periphery and that microchip 140 is therefore exposed to light 165 from lamp 164.

Figure 6C:
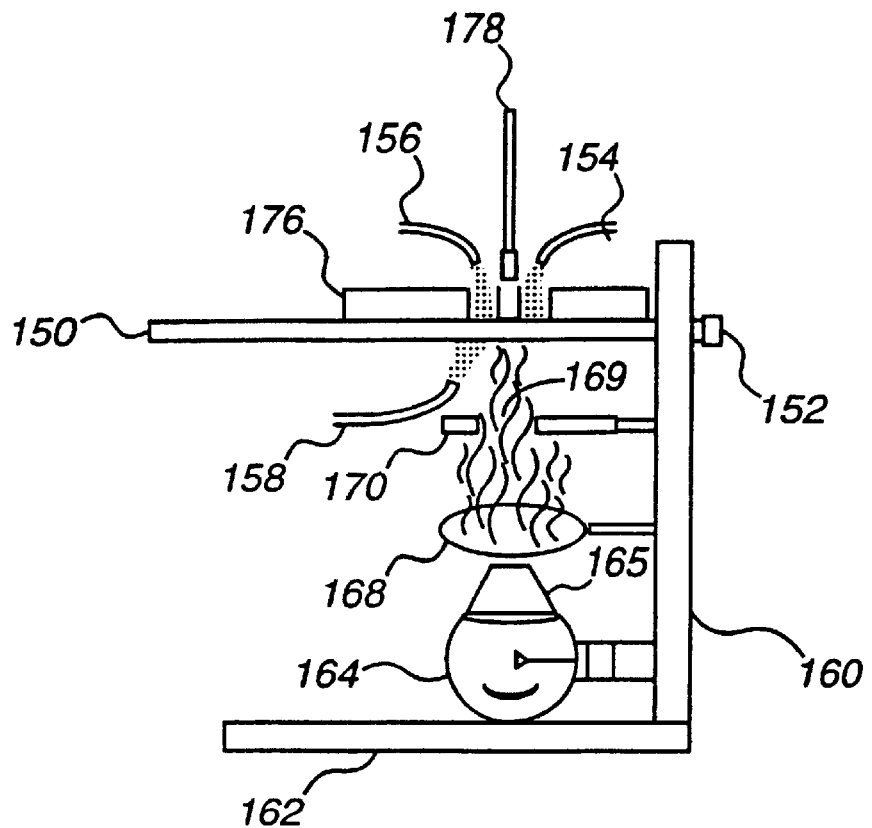
Figure 6D:
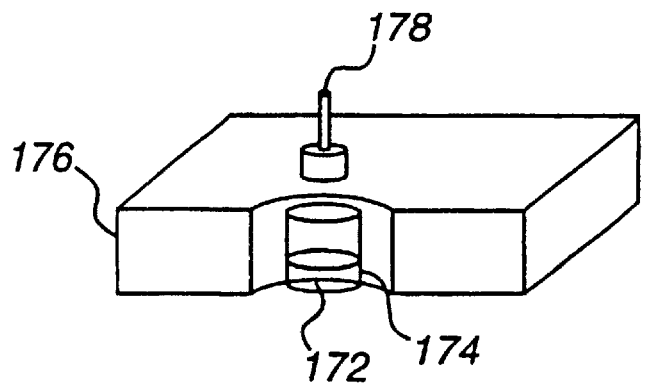

FIGS. 6C and 6D depict an embodiment using only one entrenched reservoir 174 containing sample 172 within microchip 176. A thermo-optical sensing device 178 is positioned above the sample 174 in entrenched reservoir 172. FIG. 6C further illustrates that the aperture 169 in light restricting means 170 can be adjusted. It will be appreciated that the temperature sensing means, cooling means and heating means as shown in FIGS. 6A–6D are operatively associated with a microprocessor, which is not shown.

As can be seen from the figures, according to the present invention both a non-contact heat source and a non-contact cooling source are used. This allows for repeated introduction of any number of reaction vessels in and out of the apparatus. Thus, the present invention provides an economic advantage over other thermocycling apparatus, in that it is only a relatively inexpensive microchip, capillary tube, or other reaction vessel that must be changed for every sample. Some methods provided in the art require the physical attachment of the heating and/or cooling means to the reaction vessel itself. Therefore, unless the reaction vessel could be completely cleaned to ensure that contamination from one sample to another did not occur, a new chip attached to a new heating and/or cooling device would have to be provided for every sample. While for ease of reference only one sample-containing vessel was shown and/or described in these embodiments, it is equally within the scope of the invention to thermocycle two or more samples at the same time. In addition, because the heating and cooling means are relatively stationary in the apparatus of the present invention, the reaction vessel can be moved in any direction relative to the heating and/or cooling sources.

The above apparatus provide for rapid heating and cooling of a sample in a precise and easy to replicate manner. Heating can be effected for example as quickly as 10° C. per second when using approximately 15 to 50 $\mu$L volumes of sample in a microchamber and as rapidly as 100° C. per second when using nanoliter volume samples in a capillary; cooling can be effected quickly, typically in the range of between about 5 and 50° C. per second. The increased effectiveness of heating and cooling improves the cycling process and sharpens the temperature profile. This means that the desired reaction can be conducted under more optimal thermal conditions than in conventional instruments. Thermal gradients in the reaction medium frequently observed in instrumentation using a contact heat source are detrimental to the specificity of the reaction. These thermal gradients are substantially reduced in the IR mediated heating, particularly when the heat source is strong enough to penetrate the aqueous mixture and provide sufficient irradiation to the opposite side of the reaction vessel. Non-contact, rapid cooling, such as that provided in the present invention, also contributes to the ability to obtain sharp transition temperatures in minimum time and to achieve fast and accurate temperature profiles.

In the PCR art, it has been shown that amplification yields and product specificity are possible when denaturation or annealing times are kept to a minimum, provided that denaturation takes place before annealing. Furthermore, it has also been demonstrated that there is little change in the product yield with annealing times longer than 20 seconds, translating into a total cycling time between 15 and 30 seconds. Such rapid cycling times are hard to achieve using conventional instrumentation, however, due to sluggish heat transfer. The present invention is able to perform such cycling profiles due to its direct way of heating the reaction medium in conjunction with its very effective cooling system.

The present invention also teaches methods and apparatus for use of an IR heat source in conjunction with a microchip that allows for movement or "pumping" of the sample through the chip.

Electrophoretic "chips" consist of glass or plastic substrates into which a pattern of microchannels, often simple but sometimes complicated, have been fabricated. Embodiments of such chips are shown in FIGS. 1 and 2. The microchannels terminate at reservoirs which are often drilled holes in the structure itself and which hold volumes as low as a few microliters to as much as several tens of microliters. The flow or pumping of fluid through the microchannel architecture, that is, from one reservoir to another or through any components fabricated within the microchannels themselves, is typically carried out in one of two ways: by hydrostatic pressure or by electric field-driven flow (endosmotic flow or "EOF").

Microchannel structures on electrophoretic chips are typically in the micrometer range, with depths ranging from 10–50 $\mu$m and widths from 30–100 $\mu$m. A microchannel with the dimensions of 10 $\mu$m (deep)×50 $\mu$m (wide)×3 mm (long) has a total microchannel volume of 1.5 nanoliters (nL). Therefore, to flow the equivalent of 20 microchannel volumes of a given solution through this particular microchannel would require the pumping of 30 nL of solution. The controlled flow of these ultralow volumes through the microchannels of microfabricated electrophoretic devices may be difficult to regulate with hydrostatic pressure. The low volume pumping of solution on chips is more conducive to EOF which can be controlled quite accurately by the magnitude of the voltage applied. A limitation associated with EO-driven flow, however, is its dependence on two parameters: 1) the ionic strength of the constituents of the solution being pumped; and 2) the chemical composition of the microchannel wall. For example, a low, negligible EOF is likely to result when using solutions containing a large salt concentration, such as 100 mM NaCl or 2× TBE solutions. Low EOF will also result when the interior channel walls are composed of a neutral or nonionic substance such as plastic. Under such conditions, EO flow is likely to be of limited use with respect to its ability to pump solution through the microchannel architecture. This limits the use of microfabricated electrophoretic devices as the basic element in the "laboratory on a chip" concept where a diverse array of biological and chemical solutions will need to be pumped effectively through the microchannel architecture.

The present invention overcomes these limitations in the art. The ability to do accurate temperature cycling on localized volumes of solution ranging from as low as a few microliters to up to several hundred microliters, such as through the methods and apparatus taught herein, could be exploited for accurate pumping of small volumes (nL-$\mu$L) of solution through microchannel structures. The basis for the pumping is thermal expansion of liquids. In a confined space, a change of 100° C. can result, for example, in the generation of up to 10 psi within the chamber; if the only exit in the chamber was a microchannel, fluid would be forced from the chamber through the microchannel. The flow rate could be controlled very accurately by changes in temperature as little as 1–2° C.

EXAMPLES

The following examples are intended to illustrate the invention and should not be construed as limiting the invention in any way. The examples illustrate that the present methods and apparatus can be used to effectively carry out various types of fast and accurate thermal cycling. Results obtained using the present methods are comparable to those obtained using conventional methods, which take considerably longer to complete. In addition to generic thermal cycling experiments, two different PCR amplifications were performed using the T-cell receptor β-chain using standard and quantitative competitive (QC) PCR. A cycle sequencing reaction was also performed.

Acrylamide used in the Examples was obtained from Bio-Rad (Hercules, Calif.). A 5× stock solution of tris-borate-EDTA (TBE; Sigma Chemicals, St. Louis, Mo.) was appropriately diluted and titrated to pH with sodium hydroxide. Dissolution of hydroxyethyl cellulose (HEC) was accomplished by heating the TBE solution to 56° C., and adding the cellulose powder slowly to the rapidly stirring solution. The turbid solution was mixed on a stirring hot plate until it cleared (about 15 min at a setting of 2 out of 10), the heat was removed, and the mixture stirred for an hour. The solution was filtered through an 0.8 mm filter (Nalgene), and stored at +4° C. Before use, the HEC solution was brought up to room temperature, and 1-(4-[3-methyl-2,3-dihydro-(benzo-1,3-oxazole)-2-methylidene]quinolinium)-3-trimethyl-ammonium propane diodide (YO-PRO-1) was added (1:1000 dilution of the 1 mM solution obtained from the manufacturer) to a final concentration of 1 $\mu$M.

For the testing of the IR-mediated thermocycling and comparison with standard thermocyclers, both PCR and quantitative competitive (QC)-PCR, the amplification of the T-cell receptor $\beta$-chain was conducted as described by Johnston et al., *Nuc. Acids Res.*, 23:3074–3075 (1995). Each 15 $\mu$L reaction consisted of final concentrations of 100 mM Tris-HCl (pH 8.3), 50 mM KCl, 1.5 mM $MgCl_2$, and 20 $\mu$M each dNTP (dATP, dCTP, dGTP, and dTTP, Promega, Madison, Wis.). Included in each reaction were 15 ng each of upstream primer Vb8.2 (CATTATTCATATGGTGCTGGC) and downstream primer CbSeq (GTCACATTTCTCAGATCCTC), 2.4 $\mu$L of diluted TaqStart Antibody (Clontech, Palo Alto, Calif.)/Taq DNA polymerase (Promega) mix prepared according to the antibody manufacturer's recommendations and 1 $\mu$L, approximately 5 ng, of PCR product generated from a TCR-$\beta$ chain found in an H-Y incompatible graft undergoing rejection. The templates were also generated as described by Johnston et al. Reaction mixtures were stored at 4° C., and warmed to room temperature prior to cycling.

The amplification of a perform fragment and a competitor DNA fragment was conducted as described above for the T-cell receptor $\beta$-chain. Each 15 $\mu$L reaction consisted of final concentrations of 10 mM Tris-HCl (pH 8.3), 50 mM KCl, 1.5 mM $MgCl_2$, and 20 $\mu$M each dNTP (dATP, dCTP, dGTP, and dTTP, Promega, Madison, Wis.). Included in each reaction mixture were 20 pmoles each of primer (AGCTGAGAAGACCTATCAGG) and primer (GATAAAGTGCGTGCCATAGG), 2.4 $\mu$L of diluted TaqStart Antibody (Clontech, Palo Alto, Calif.)/Taq DNA polymerase (Promega) mix prepared according to the antibody manufacturer's recommendations, and approximately 5 ng of PCR product from a reverse-transcribed and amplified (RT-PCR) reaction for mouse perform and its competitor. These methods were also carried out according to Johnston et al.

The fluorescent cycle sequencing reactions were carried out using the ABI Prism™ dRhodamine Terminator Cycle Sequencing Kit according to the manufacturer's (Perkin-Elmer, Norwalk, Conn.) instructions. To do this, 500 ng of template DNA was combined with 3.2 pmoles of the sequencing primer and 8 $\mu$L of the Terminator Ready Reaction Mix in a final volume of 20 $\mu$L with sterile, distilled $H_2O$. Reaction mixtures were heated at 96° C. for 10 sec, 50° C. for 5 sec and 60° C. for 240 sec; for 25 cycles on a model 9600 GeneAmp PCR System (Perkin-Elmer).

The microchambers for noncontact-mediated PCR according to the present invention were made from rectangular borosilicate glass stock, 500 $\mu$m×5.0 mm (o.d.)(Wale Apparatus Co., Hellertown, Pa.—part #4905-100) cut into 13 mm lengths, with one end sealed (total volume about 28 $\mu$L). The microchambers were cleaned with sodium ethoxide, rinsed with methanol twice, and air-dried before being coated with bis(trimethylsilyl)trifluoroacetamide (bisTMSTFA, Sigma Chemical Company, St. Louis, Mo.). After coating for 30 min., the chambers were emptied, flushed twice with methanol, and air-dried.

The hardware for performing the thermocycling experiments was constructed in-house. The apparatus included a Dell Pentium PC outfitted with an analog to digital (A/D) converter board (ComputerBoards, Inc., Mansfield, Mass.) with a 12 bit resolution at a voltage range of the input signal between 0–5 volt. The desired temperature parameters were controlled through a computer program that was interfaced with the hardware via the analog to digital (A/D) converter board.

Briefly, a thermocouple with an outer diameter of 0.005 inch (Omega, Stamford, Conn.) was inserted into one of a pair of reaction chambers placed side-by-side in the path of and equal distance from the optical energy. The copper/constantan thermocouple was fed to a thermocouple amplifier (Model TAC386-TC, Omega, Stamford, Conn.) with an output of 1 mV/° C. This signal was further amplified by an op amp to produce a signal of about 20 mV/° C. Data acquisition for the thermocouple reading was at a rate of 10 Hz.

The air for cooling was controlled by a digital output (TTL) from the A/D converter board in the computer. This TTL-level output was fed to a solid-state relay (ODCM-5, Potter-Brumfield) which controlled a pneumatic valve (24 volt, 53HH8DGB, Peter Paul). The air pressure, supplied through a gas cylinder, was controlled by a panel mount regulating valve (B-ORF2, Whitey).

The infrared light was produced by a tungsten lamp (CXR, 8V, 50 W, General Electric) powered by a 5 volt AC/DC transformer. This particular type of lamp is commonly used in slide projectors. It is designed to collect most of the emitted radiation inside the lamp to focus the entire optical energy on a focal point about 1.5 cm outside of the lamp in a 2 mm to 4 mm spot. This lamp has a reflecting film on the inside of the lamp housing which acts as a mirror for the generated light/heat. The emitted light is collected inside the bulb the radiation is focused on a spot outside of the lamp bulb. The lamp intensity was modulated by a digital signal (TTL-output) from the A/D board to activate the solid-state relay (OACM-5, Potter-Brumfield).

The desired temperature profile is programmed into the computer as a Labview application (National Instruments, Austin, Tex.) which communicates through the A/C computer board with the analog devices. The temperature in the sample was maintained through the exact control of the heating and cooling intervals based upon feedback from the thermocouple. Closure of the solid-state relay switches the lamp on to heat the sample while an open relay turns the lamp off. Cooling was effected by use of compressed air, controlled through a solenoid valve. On and off position of the solenoid valve are equivalent to cooling and not cooling, respectively.

More specifically, proportional control was used to maintain the desired temperatures. This method of control varies the magnitude of heat applied to the sample in proportion to the size of the error. If the sample temperature was greater than 4° C. from the programmed temperature, a heat pulse of larger duration was used. If the difference was only 0.2° C., a heat pulse of shorter duration was used. The Labview application also controlled the temperature limits and the duration of the dwell times of the thermocycling process.

For comparison, all of the PCR were also carried out using commercially available methods. Samples were contained in polyethylene Eppendorf tubes in a Peltier block based PCR. For the TCR-β amplifications, including the QC-PCR, thirty cycles of 30 sec of denaturation at 94° C., 30 sec of annealing at 55° C., and 60 sec of extension at 72° C. were carried out. A first cycle included 5 min. of denaturation time at 94° C., and a final cycle included 5 min. of extension time at 72° C. For the cycle sequencing reaction, the reaction mixture was heated at 96° C. for 10 sec, 50° C. for 5 sec and 60° C. for 240 sec for 25 cycles in a model 9600 GeneAmp PCR System (Perkin Elmer).

Following thermocycling, the various samples were analyzed using gel electrophoresis. DNA amplification products analyzed by gel electrophoresis were separated on a 3% agarose gel, NuSieve™ 3:1 agarose (FMC Bioproducts, Rockland, Me.), which is a blend of three parts NuSieve and one part SeaKem™ LE agarose. Electrophoresis was carried out using a Hoefer HE 33 (Hoefer Pharmacia Biotech, San Francisco, Calif.) horizontal apparatus at 5.0 V/cm for approximately 40 min in 1×TAE buffer. DNA was visualized by ethidium bromide staining in TAE buffer after electrophoresis and observing the DNA fragments over a short wavelength UV Transilluminator (Fisher Biotech, Pittsburgh, Pa.).

The capillary electrophoresis conditions used involved a 50 microns internal diameter×20 cm length to detector (27 cm total length) DB-17-coated $\mu$-Sil capillary, (J & W Scientific, Folsom, Calif., USA). The capillary was fitted in a PACE™ cartridge for use with a Beckman PACE model 2100 equipped with a laser induced fluorescence (LIF) detector with detection at 510 nm. Excitation of the fluorescent intercalator (YO-PRO-1) was induced with a 488 nm argon laser. (Beckman Instruments, Fullerton, Calif., USA). Sample diluted 1:50 with water and then injected electrokinetically for 2 sec at 3 kV. The sample injection was flanked by 1 sec (1 kV) electrokinetic injections of water. The separation was carried out at 7.5 kV (277 V/cm; 9 $\mu$A) with the sample injected at the outlet end of the capillary and electrophoresed toward the detector (7 cm effective capillary length) and inlet.

Example 1

Figure 7A:
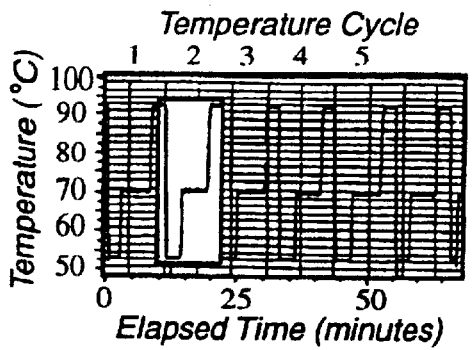
FIGS. 7A–7D show the results obtained in Example 1.
Figure 7B:
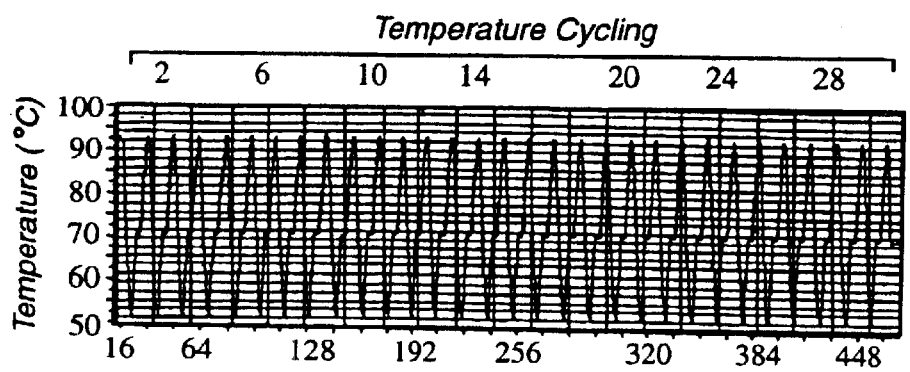
Figure 7C:
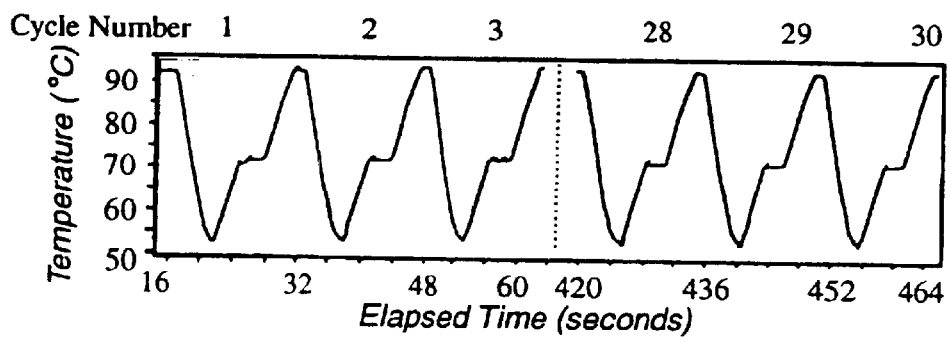
Figure 7D:
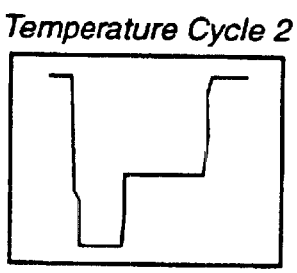

Glass microchambers prepared as described above were filled with about 5 $\mu$L of sample. PCR buffer was used as the sample to demonstrate the ability of the methods and apparatus of the present invention to perform fast and accurate thermocycling. A tungsten lamp was used for heating the sample from a distance of 2 cm with cooling facilitated by chilled compressed air. A thermocouple was placed inside the microchamber to monitor the solution temperature and control the thermocycling. FIG. 7A shows the thermocycling profiles obtained with 94° C./55° C./72° C. dwell times of 30 sec/30 sec/60 sec, resulting in roughly 135 sec cycles. Rapid temperature ramping was possible with a lamp-based heating of 10° C./sec and compressed air cooling of 20° C./sec. For the five cycles in FIG. 7A, the temperature variation with the controller set at 94° C. was 93.57±0.26° C.; at 72° C., the temperature was 71.70±0.25° C.; and at 54° C., the temperature was 53.69±0.37° C. FIG. 7D provides an exploded view of the second temperature cycle of FIG. 7A. The temperature scale is generally the same as that in FIG. 7A. FIG. 7D shows a dwell time at the lowest temperature (about 52° C.) of about 4 minutes, a dwell time at the intermediate temperature (about 70° C.) of about 7.5 minutes, and a dwell time at the highest temperature (about 94° C.) of about 4 minutes. Transition times between temperatures are about 2 seconds or less.

The cycle time was decreased using a temperature profile of 94° C./54° C./72° C. and dwell times of 2 sec/2 sec/4 sec, respectively. The profile given in FIG. 7B shows that 17 sec cycles can be attained with results comparable to those shown in FIG. 7A. The reproducibility associated with the ultrafast thermocycling was very good as evidenced by the average cycle time of 16.97±0.43 sec over the course of the 30 cycles shown in FIG. 7B, and the exploded view of some of the cycles shown in FIG. 7C. The total thermocycling time associated with 17 sec cycles, including pre-cycle activation/denaturation and post-cycle extend times, was roughly 12–14 min. This example therefore demonstrates that the methods and apparatus of the present invention can be used to effect rapid and accurate thermocycles.

Example 2

Initial Evaluation of the IR-Mediated Thermocycling System for PCR-Based Amplification of DNA Utilizing the T-Cell Receptor β-Chain (TCR-β) System Two microchambers were placed side-by-side in the IR pathway, using one as a temperature-sensing vessel and one for performing the PCR reaction shown generally in FIG. 4. This configuration allowed for monitoring the solution temperature through the "dummy" microchamber without inhibiting the PCR reaction occurring in the sample microchamber. A dual thermocouple set-up was initially used to determine the optimal positioning so that both microchambers were irradiated equally. Having determined this, an accurate thermocycling in both chambers was achieved.

Figure 8A:
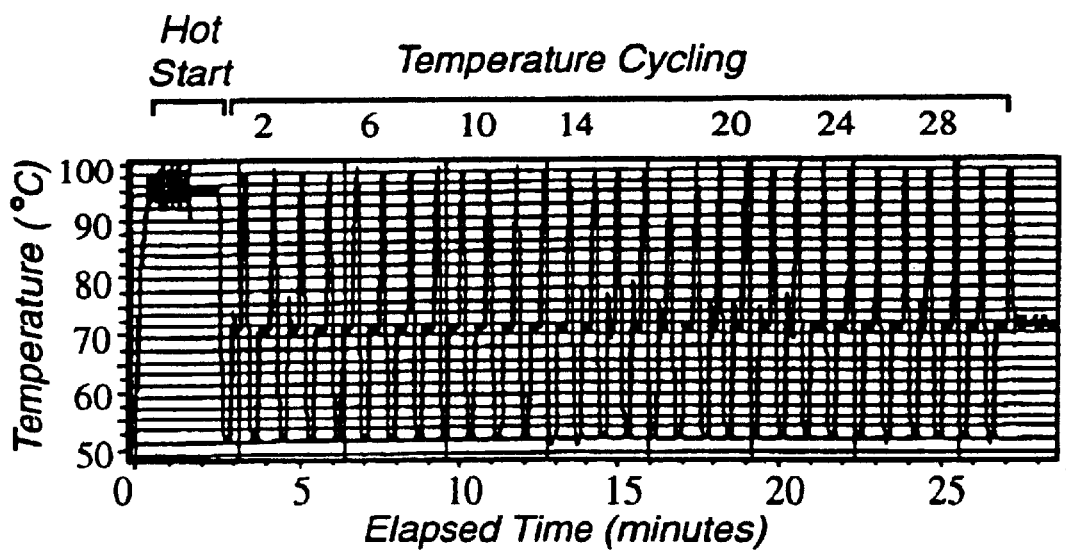
FIGS. 8A–8C show the thermocycles and the gel electrophoresis resulting from the noncontact-mediated thermocycling performed according to Example 2.
Figure 8B:
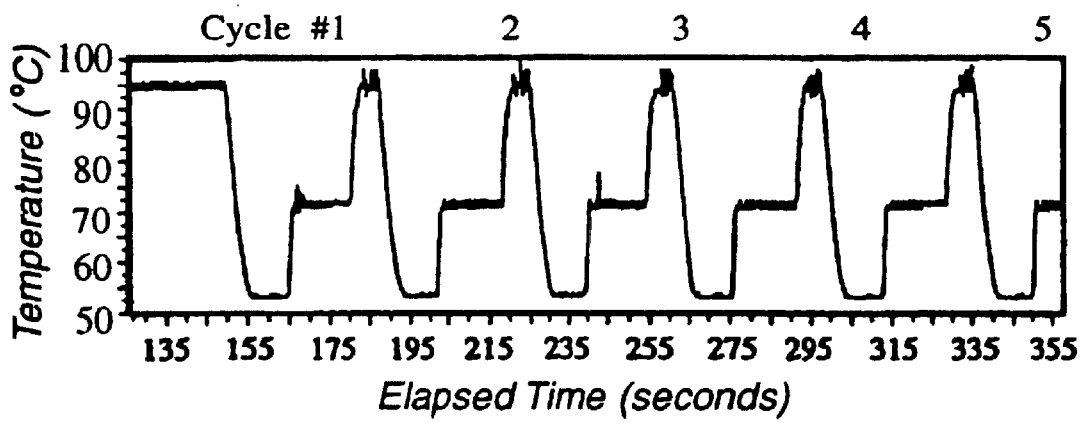
Figure 8C:
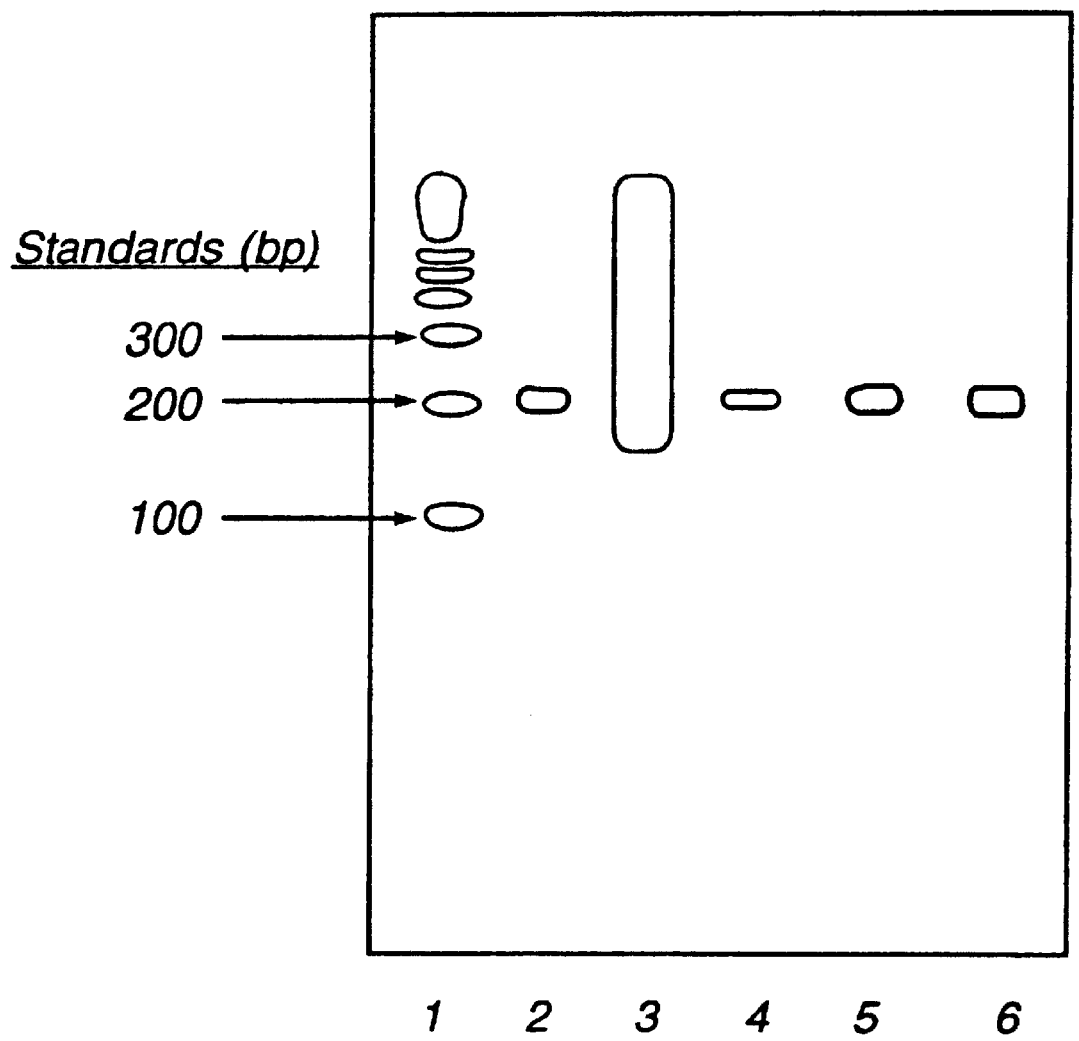

Using the dual microchamber configuration, successful PCR amplification was carried out using the TCR-β primer system. FIGS. 8A and 8B show the results of noncontact-mediated thermocycling with 30 cycles that are roughly 40 sec each in duration as a result of dwell times of 8 sec/8 sec/15 sec at about 94° C./54° C./72° C. The expanded scale (FIG. 8B) shows that, in addition to good cycle-to-cycle reproducibility, the temperature was maintained with fair accuracy at the set temperatures (94.2±0.6° C.; 71.7±0.6° C.; 54.6±0.4° C. FIG. 8C provides results of a gel electrophoresis showing that PCR amplification in response to the thermocycling shown in FIGS. 8A and 8B was successful. The positive control (lane 2), which involved PCR amplification in a glass microchamber using a commercial thermocycler, shows the abundant amplification of a 216 bp DNA product specific to TCR-β. Using the noncontact-mediated approach with 94° C./54° C./72° C. dwell times of 30 sec/30 sec/60 sec (with 300 sec pre-cycle activation/denaturation and post-cycle extend times), PCR product of a comparable molecular size is observed (lane 4), although only approximately 30% of the product obtained with the commercial thermocycler (lane 2). The apparent efficiency of amplification does not appear to be altered significantly by reducing the cycle time. Using 94° C./54° C./72° C. dwell times of 15 sec/15 sec/30 sec with 300 see pre-cycle activation/denaturation and post-cycle extend times (lane 5), or 8 sec/8 sec/115 see with 150 sec pre-cycle activation/denaturation and post-cycle extend times (lane 6), a comparable amount of product is observed. This example demonstrates that fast and accurate PCR thermocycling can be accomplished using the present invention.

Example 3

Cycle Sequencing Reaction by IR-Mediated PCR

The capabilities of the noncontact-mediated thermocycling were further explored and the ability of the novel approach to amplify DNA was tested using other PCR methods. In many laboratories, the DNA sequence is determined using a technique known as cycle sequencing. The technique is analogous to asymmetric PCR in which a single primer, target DNA, thermostable DNA polymerase and nucleotide substrates are repeatedly heated and cooled to amplify a single strand of the target DNA. In cycle sequencing, the standard four dNTPs are mixed with a small proportion of polynucleotide chain-terminating, dye-labeled dideoxyribonucleotides (ddNTPs) that occasionally substitute for the standard dNTPs. Repetition of the process allows polynucleotides not terminated with a ddNTP to act as larger primers in subsequent cycles. The net effect is enhanced sensitivity and longer sequence determinations compared to the same process run isothermally. The major steps in cycle sequencing are, thus, the thermocycling reactions and the electrophoretic separation of the dye-labeled polynucleotide chains terminated by a ddNTP. The sequence is read as a series of fluorescing colored bands (polynucleotide-ddNMP) moving past a detector in the electrophoresis instrument, each base represented by a different color.

Figure 9A:
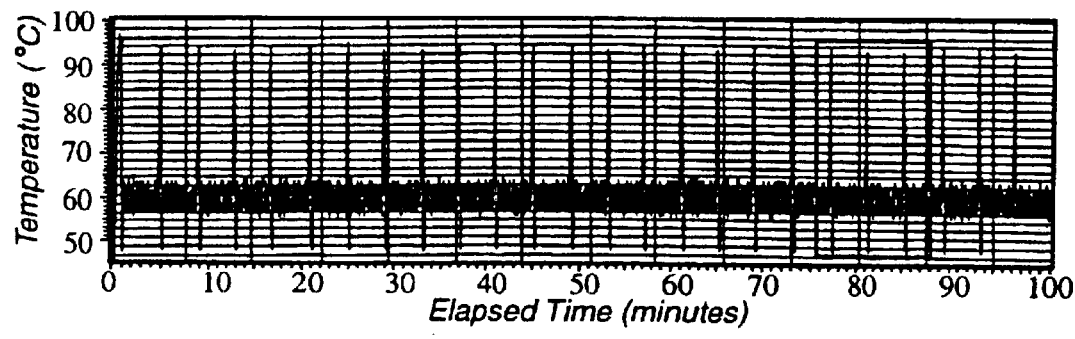
FIGS. 9A–9E show the cycle sequencing obtained according to the methods of Example 3.
Figure 9B:
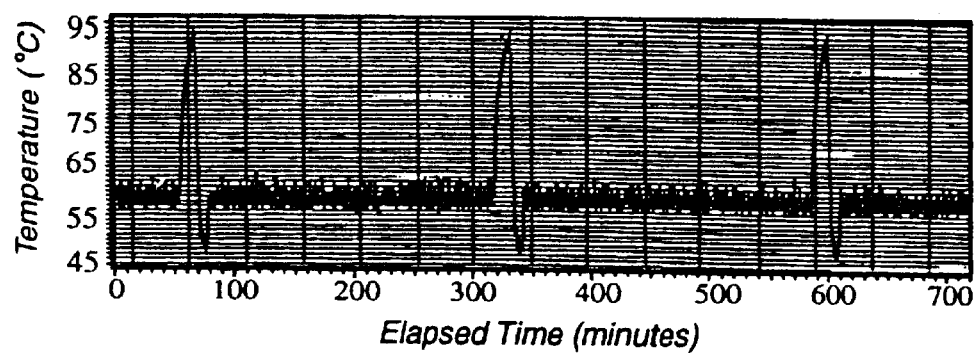
Figure 9C:
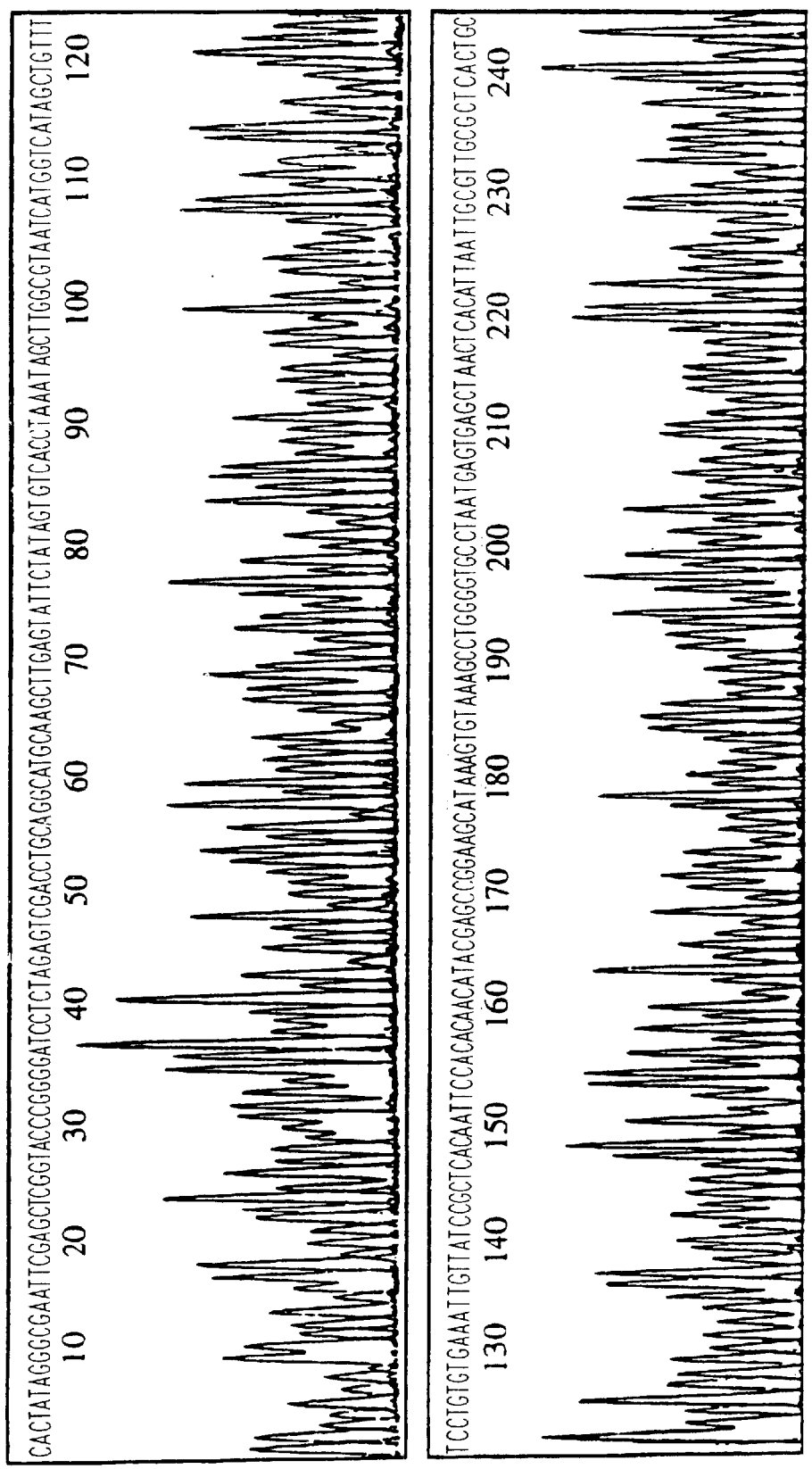
Figure 9D:
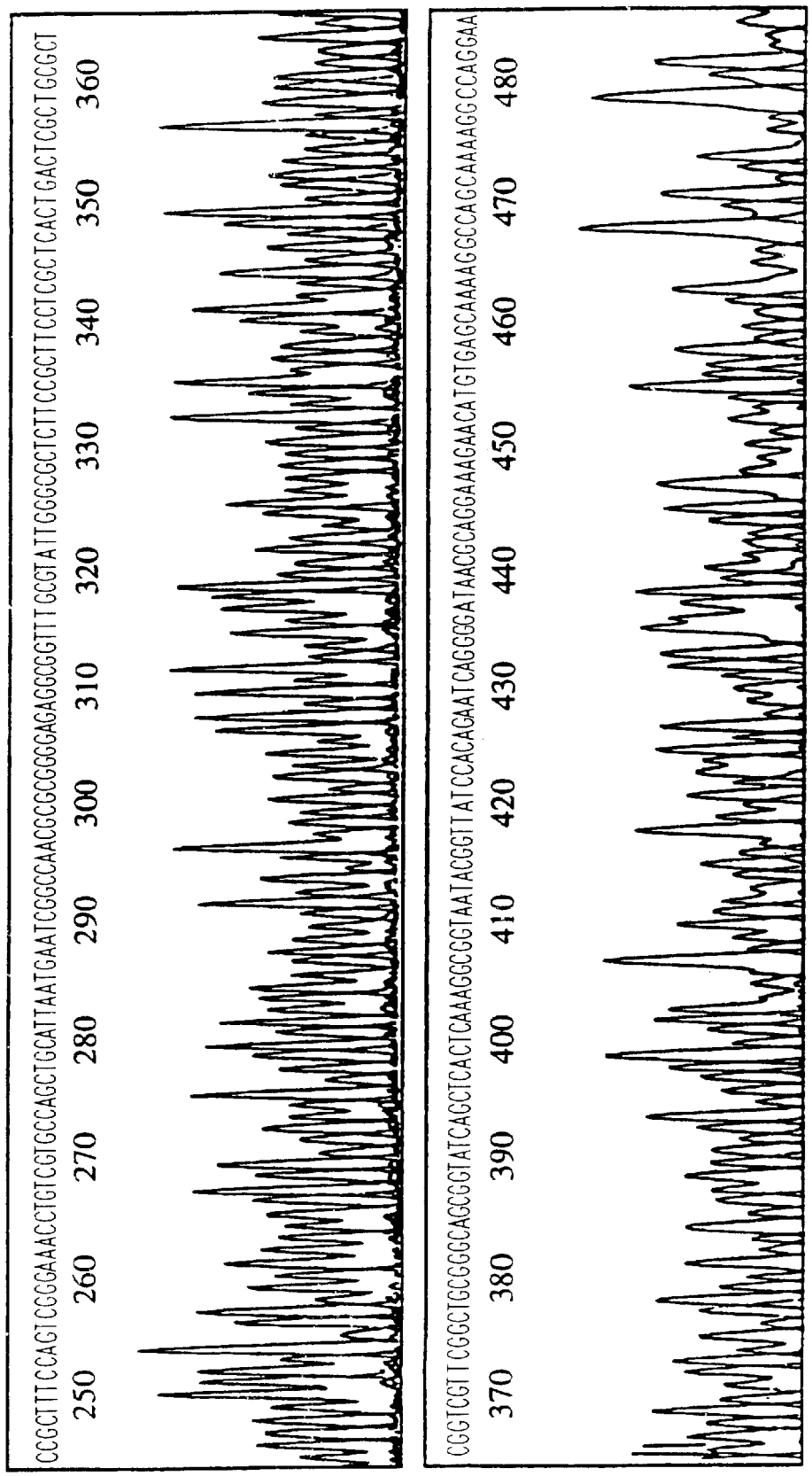
Figure 9E:
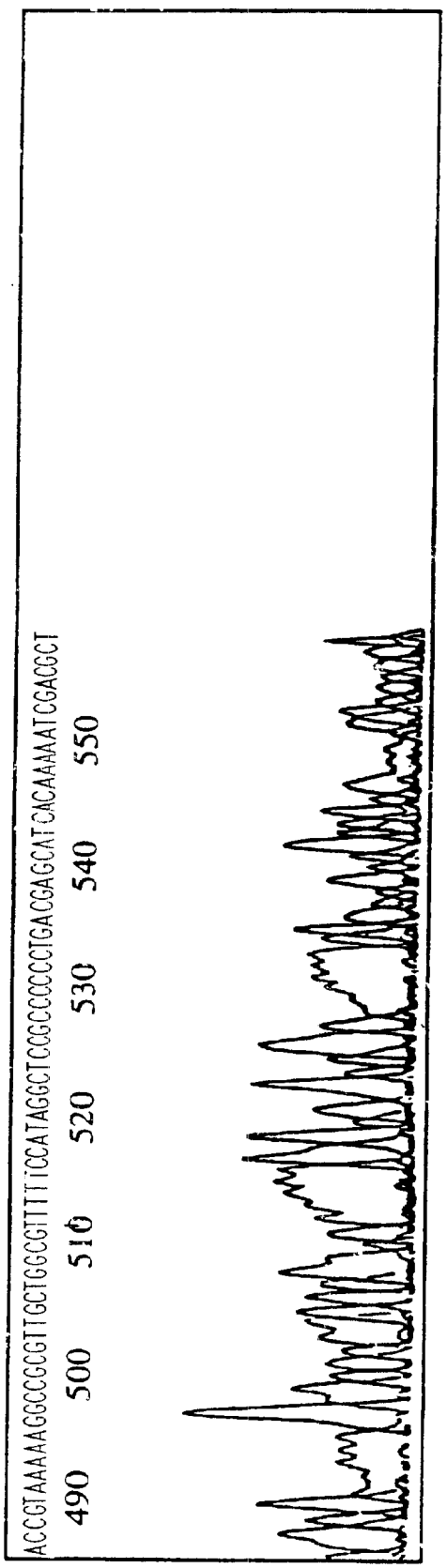

The control standard used with the ABI DNA sequencing kit (pGEM3ZF+ sequenced with the −21M13 primer) was divided into two aliquots with PCR amplification carried out with one aliquot using a commercial contact-mediated thermocycler and the other by IR-mediated thermocycling according to the methods of the present invention (both processes in glass microchambers). The thermocycling parameters used on the commercial instrument (96° C./50° C./60° C. with dwell times of 10 sec/5 sec/240 sec and 25 cycles) were also used for the IR-mediated thermocycling. Side-by-side sequencing gel analysis of the amplified products from both reactions showed that comparable results were obtained. FIGS. 9A–9C show the results of cycle sequencing in the microchambers. FIG. 9A shows the thermocycling sequencing reaction executed in a glass microchamber according to the example. FIG. 9B shows the sequencing data pGEM32F+ following cycle sequencing. FIG. 9C provides sequencing data obtained from the ABI Model 377 sequencer. The dideoxyterminated products obtained with the IR-mediated thermocycling had a signal strength of ~400, high signal to noise ratio and normal spacing, and provided sequence out to 430 base pairs. The results from the glass microchamber were indistinguishable from those routinely obtained with a standard contact-mediated thermocycler, thus demonstrating that reliable results can be obtained using the present methods and apparatus.

Example 4

Rapid Capillary Electrophoresis of DNA Amplified by IR Heat-Mediated OC-PCR

Figure 10:
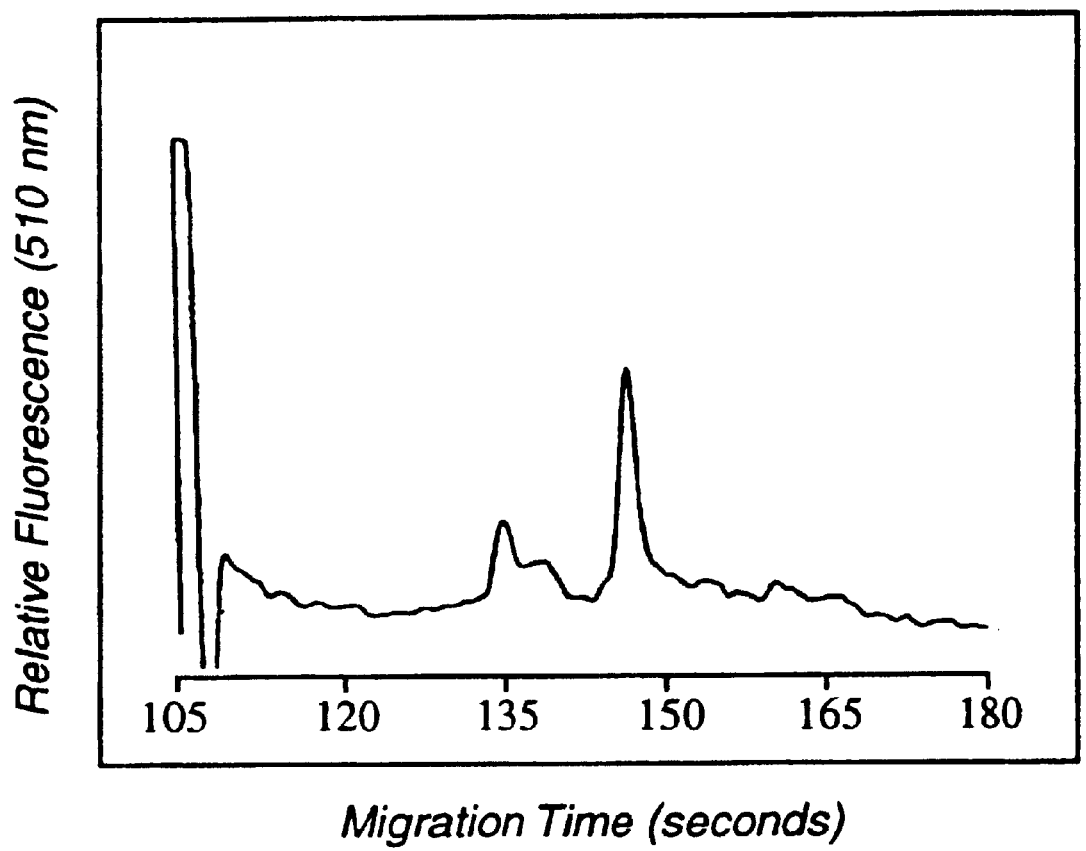
FIG. 10 is a graph of migration time versus relative fluorescence, determined according to the methods of Example 4.

IR-mediated PCR was also applied to Quantitative Competitive-PCR (QC-PCR) (the templates for the amplification coming from a QC-reverse transcription (RT)-PCR experiment) and the PCR products were analyzed by a CE-based method. This method is described in Piatak et al., Science, 259(5102):1749–54 (1993). In general terms a QC-PCR experiment involves an array of PCR reactions where a known amount of a "control" competitor RNA transcript is mixed with an aliquot of an "unknown" target RNA. The competitor and target DNAs are amplified by PCR under identical conditions, and the products quantitated. The concentration of competitor DNA that would result in an equal molar amount of both competitor and target products is used to deduce the original concentration of the target DNA transcript. FIG. 10 shows the results of amplifying such a competitive PCR reaction in the dual chamber IR-mediated cycler with our standard thermocycling program using 94° C./54° C./72° C. dwell times of 30 sec/30 sec/60 sec with 300 sec precycle activation/denaturation and post cycle external times, and then separating the products of that reaction on a short (7 cm effective length) capillary. This experiment illustrates that rapid IR-mediated PCR can be easily combined with PCR fragment sizing and identification based on a short (less than 3 min) CE analysis time. The separation of QC-PCR products from the capillary outlet to the inlet provided a rapid analysis of the two amplification products, 135 see for the competitor fragment (158 bp) and 145 sec for the target fragment (198 bp).

Not only does this example demonstrate the utility of the thermocycler for another common PCR procedure, competitive PCR reactions, but the analysis of the DNA products on the short capillary approximate the migration distance and analysis times that would be observed for an "on-chip" CE separation. By integration of "on-chip" PCR with "on-chip" CE analysis, very favorable total analysis times can be attained which would greatly facilitate tedious PCR experiments such as competitive-PCR reactions which involve several PCR reactions over a wide range of starting competitor and target concentrations. The analysis times for a complete QC-PCR experiment may take days using conventional isotope-labeling, amplification and detection methodologies. The automation offered by integration of the PCR and DNA detection methods in a chip format would be a great advance for the quantification of the competitor/target DNA combinations required to plot useful data.

Example 5

Rapid Amplification of DNA by IR-Mediated PCR in a Capillary

IR mediated PCR was also conducted using the apparatus shown in FIG. 5, which allowed for thermocycling of nanoliter volumes in a small channel-like structure. In this particular example the sample was thermocycled as a plug of a defined length in a 'bulk solution'. For this experiment a thermocouple was placed into a 8 cm long $\mu$sil DB-17 capillary with a 150 $\mu$m I.D. (J&W Scientific, Folsom, Calif.) to serve as a reference reaction vessel in which the temperature was measured. The thermocouple was position in the middle of that piece of capillary where about a 2 cm long optical transparent window was burnt into the polyimide coating surrounding the capillary. The capillary was filled with a PCR reaction solution without the Taq enzyme and its antibody and sealed on both ends with epoxy glue to prevent evaporation of liquid from the capillary during thermocycling. An 8 cm long 100 $\mu$m I.D. capillary of the same type DB-17 was used as the actual reaction vessel in which the PCR thermocycling procedure took place. Also here, a 2 cm long optical transparent window was burnt into the polyimide coating in middle of the capillary and both capillaries were placed into the path of the IR energy. The capillaries were horizontally aligned 1.5 cm in front of the tungsten lamp with an xyz translation stage so that the optical windows of both capillaries were optimally irradiated. A mirror placed behind the capillaries enhanced the effect of heating. A stream of compressed air at 18° C. was pointed at the capillary along their length axis to effect the cooling of the sample in the capillary.

Figure 11A:
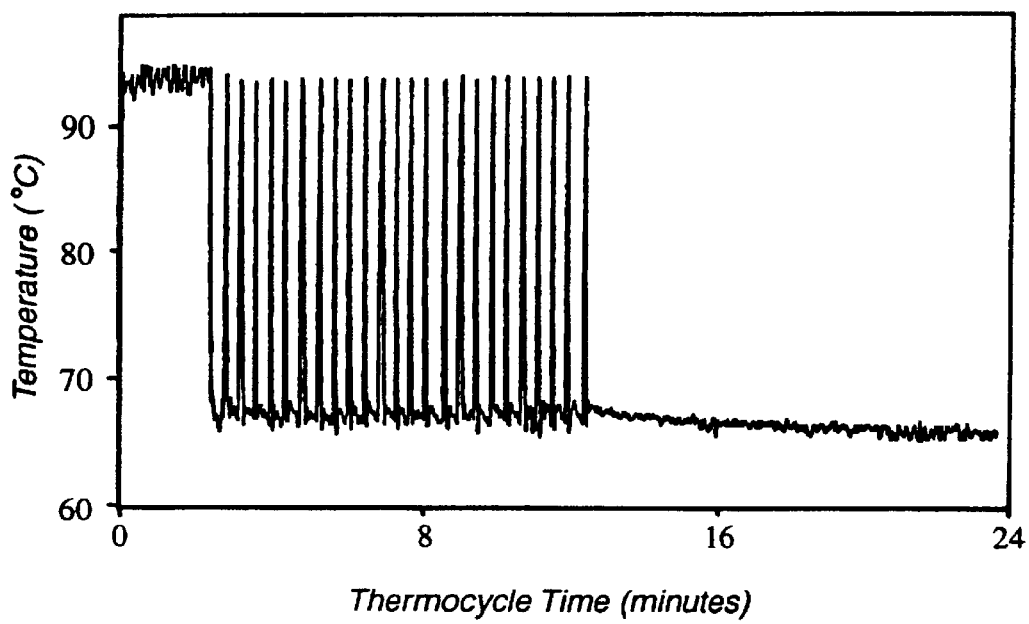
FIGS. 11A and 11B show the result obtained with the embodiment illustrated in FIG. 5.

The 8 cm long 100 $\mu$m I.D. DB-17 capillary was filled with 1% (w/v) hydroxyethylcellulose (HEC) in 1×TBE, pH 8.6, solution except for a 2 cm long plug, corresponding to ~160 nl volume, in the middle of the capillary at the optical window which contained the PCR reaction solution. The thermocycling was tested using a GeneAmp PCR Reagent Kit with native Taq DNA Polymerase (N801-0043, Perkin Elmer, Norwalk, Conn.) containing the appropriate lambda control primers and lambda DNA to amplify a specific DNA sequence of 500 bp length. The PCR reaction solution was made as a 50 μl stock solution according to the manufacturer's specifications, except that the 1.25 units of Taq DNA Polymerase were substituted with 2.5 units of the same enzyme bound to the TaqStart Antibody (Clontech, Palo Alto, Calif.) for the hotstart. The thermocycling protocol—a profile depicted in FIG. 11A—was a two cycle procedure with dwell times at 94° C. for 5 sec and 68° C. for 20 sec for 25 cycles with a 2.5 min preincubation at 94° C. and a final extension of 11 min at 68° C. The 50 μl PCR stock solution was divided into two parts. One part (~2 μl) of the solution was partially used to fill the 2 cm plug in the capillary whereas the second part was used to conduct the control experiment using dwell times at 94° C. for 15 sec, and 68° C. for 60 sec for 25 cycles with a 5 min preincubation at 94° C. and final extension of 10 min at 68° C. in a conventional PCR thermocycler (Progene, Techne, Inc., Princeton, N.J.).

After the thermocycling of the PCR mixture in the capillary the sample plug was removed from the capillary and diluted with 9 μl of PCR reaction buffer (10 mM Tris, pH 8.6, 50 mM KCl, 2.5 mM $MgCl_2$ and 1 μM of each dNTP) and injected electrokinetically at 6.1 kV for 20 sec into the capillary electrophoresis for analysis. The sample injected was flanked with a 3 sec 3.5 kV electrokinetic injection of water. The control sample cycled in the conventional PCR thermocycler was injected unchanged for analysis using the same injection conditions as the ones described above.

The analysis of the PCR amplification product by capillary electrophoresis was conducted using the same instrumentation and conditions as described in the other examples except the sample preparation and injection conditions were altered as specified above and the separation was conducted from the inlet to the outlet of the capillary.

Figure 11B:
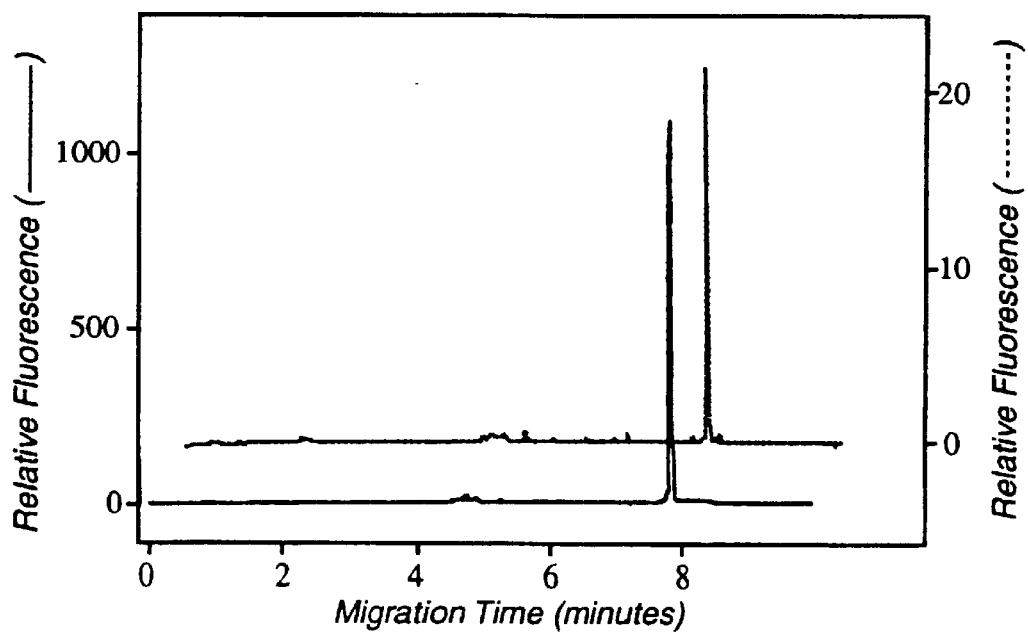

Quantitative and qualitative analysis of the product formed in the sample plug exposed to the PCR thermocycling procedure in the capillary showed that amplification of the specific lambda DNA sequence is equivalent to the amplification product obtained from the control experiment in the conventional apparatus as shown in FIG. 11B. The PCR reaction has very high demands on the accuracy of the thermocycling parameters and is therefore an ideal assay to test the accuracy of the thermocycling method and apparatus. The successful amplification of the 500 bp product in sample plug in the capillary is therefore proof of the extremely rapid and accurate thermocycling achieved with the method and apparatus of this invention.

Whereas particular embodiments of this invention have been described above for purposes of illustration, it will be evident to those skilled in the art that numerous variations of the details of the present invention may be made without departing from the invention as defined in the appended claims.

What is claimed is:

1. An apparatus for thermocycling a sample comprising:
   (a) a suitable reaction vessel for containing the sample;
   (b) non-contact optical energy means for directly heating the sample to a first desired temperature;
   (c) non-contact means for positively cooling the sample to a second desired temperature;
   (d) means for monitoring the temperature of said sample;
   (e) a microprocessor means operatively associated with said heating means, said cooling means, and said temperature monitoring means and for controlling the heating and cooling means, wherein the microprocessor means has means for effecting heating at a rate of between 10 C/second and 100 C/second and cooling at a rate of between about 5 C/second and 50 C/second and a means for completing one thermocycle in bewteen less than 0.5 second and about 20 seconds.

2. The apparatus of claim 1, wherein said suitable reaction vessel is selected from the group consisting of a capillary tube, a microchip, a microchamber and a microtiter plate.

3. The apparatus of claim 2, wherein said heating means is an IR source.

4. The apparatus of claim 3, wherein said IR source is a halogen lamp.

5. The apparatus of claim 3, wherein said IR source is a tungsten lamp.

6. The apparatus of claim 3, wherein said IR source is disposed in a spaced relationship with respect to said reaction vessel.

7. The apparatus of claim 6, further comprising filter means interposed between said IR source and said reaction vessel.

8. The apparatus of claim 1, wherein said cooling means is a compressed air source.

9. The apparatus of claim 8, wherein said compressed air source has means for chilling air.

10. The apparatus of claim 8, wherein the air from said cooling means has a pressure of between about 1 and 150 psi.

11. The apparatus of claim 8, wherein the rate of flow of air from said compressed air source is controlled by a solenoid valve.

12. The apparatus of claim 8, wherein said cooling means is structured to cause forced air to impinge on said reaction vessel from a position angularly offset with respect to the direction of heat applied from said heating means.

13. The apparatus of claim 1, wherein said means for monitoring the temperature of said sample is disposed adjacent to said reaction vessel.

14. The apparatus of claim 13, wherein said temperature monitoring means includes thermocouple means.

15. The apparatus of claim 14, wherein said thermocouple means is disposed in a second reaction vessel containing a blank.

16. The apparatus of claim 14, wherein said thermocouple means is a thermo-optical sensing device positioned above a sample in the reaction vessel.

17. The apparatus of claim 14, wherein said thermocouple means includes a sealed vessel containing a blank and wherein said sealed vessel is disposed adjacent to said sample containing reaction vessel.

18. The apparatus of claim 1, wherein said microprocessor means has means for establishing a plurality of desired temperatures and a plurality of desired dwell times at each desired temperature.

19. The apparatus of claim 1, wherein said microprocessor means has means for effecting DNA amplification in a sample.

20. The apparatus of claim 8, wherein a plurality of compressed air sources are provided.

21. The apparatus of claim 7, further comprising light restricting means interposed between said filter means and said reaction vessel; wherein said light restricting means has an aperture that can be adjusted to allow the desired amount of light to impinge on said reaction vessel.

22. The apparatus of claim 1, further comprising stage means on which said reaction vessel is placed.

23. The apparatus of claim 22, wherein said stage means is movable.

24. The apparatus of claim 1, further comprising means for reflecting radiation from said heat source towards said reaction vessel.

25. The apparatus of claim 24, wherein said reflecting means is a mirror disposed on one side of said reaction vessel and said heating means is disposed on the opposite side of said reaction vessel.

26. The apparatus of claim 25, further comprising a filter means interposed between said heat source and said reaction vessel.

* * * * *

UNITED STATES PATENT AND TRADEMARK OFFICE
CERTIFICATE OF CORRECTION

PATENT NO. : 6,413,766 B2
DATED : July 2, 2002
INVENTOR(S) : Landers et al.

It is certified that error appears in the above-identified patent and that said Letters Patent is hereby corrected as shown below:

Column 16,
Line 14, delete "6f" and insert in its place -- of --.

Column 19,
Lines 38 and 51, delete "perform" and insert in its place -- perforin --.

Column 22,
Line 41, after "54.6±0.4°C." insert -- ). --.
Lines 56 and 58, delete "see" and insert in its place -- sec. --.

Column 23,
Line 53, delete "OC-PCR" and insert in its place -- QC-PCR --.

Column 24,
Line 13, delete "see" and insert in its place -- sec. --.
Line 46, delete "position" and insert in its place -- positioned --.

Column 26,
Line 7, after "between", insert -- about --.
Line 10, delete "and" and insert in its place -- to --.
Line 15, delete "claim 2" and insert in its place -- claim 1 --.

Signed and Sealed this

Seventh Day of October, 2003

JAMES E. ROGAN
*Director of the United States Patent and Trademark Office*